(12) United States Patent
Engelbart et al.

(10) Patent No.: US 10,661,512 B2
(45) Date of Patent: May 26, 2020

(54) MEASUREMENT OF PLY BOUNDARIES

(71) Applicant: The Boeing Company, Chicago, IL (US)

(72) Inventors: Roger W. Engelbart, St. Louis, MO (US); Reed Hannebaum, Belleville, IL (US); Eric Rector, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 310 days.

(21) Appl. No.: 15/497,034

(22) Filed: Apr. 25, 2017

(65) Prior Publication Data

US 2018/0304558 A1    Oct. 25, 2018

(51) Int. Cl.

| | | |
|---|---|---|
| *B32B 41/00* | (2006.01) | |
| *B29C 70/38* | (2006.01) | |
| *G01B 11/00* | (2006.01) | |
| *G01C 11/04* | (2006.01) | |
| *G01C 11/02* | (2006.01) | |

(52) U.S. Cl.
CPC ............ *B29C 70/388* (2013.01); *B29C 70/38* (2013.01); *G01B 11/00* (2013.01); *G01C 11/02* (2013.01); *G01C 11/04* (2013.01)

(58) Field of Classification Search
CPC ....... B29C 70/388; B29C 70/38; G01C 11/02; G01C 11/04; G01B 11/00
USPC ............................ 156/64, 350, 351, 378, 379
See application file for complete search history.

(56) References Cited

U.S. PATENT DOCUMENTS

| | | |
|---|---|---|
| 6,799,619 B2 | 10/2004 | Holmes et al. |
| 6,814,822 B2 | 11/2004 | Holmes et al. |
| 6,871,684 B2 | 3/2005 | Engelbart et al. |
| 7,039,485 B2 | 5/2006 | Engelbart et al. |
| 7,171,033 B2 | 1/2007 | Engelbart et al. |
| 7,193,696 B2 | 3/2007 | Engelbart et al. |
| 7,236,625 B2 | 6/2007 | Engelbart et al. |
| 7,289,656 B2 | 10/2007 | Engelbart et al. |
| 7,362,427 B2 | 4/2008 | Fayolle et al. |
| 7,372,556 B2 | 5/2008 | Engelbart et al. |
| 7,424,902 B2 | 9/2008 | Engelbart et al. |

(Continued)

FOREIGN PATENT DOCUMENTS

| | | |
|---|---|---|
| WO | WO9850827 A2 | 11/1998 |
| WO | WO2009021038 A1 | 2/2009 |

OTHER PUBLICATIONS

Cemenska et al., "Automated In-Process Inspection System for AFP Machines", Electroimpact Inc., SAE International, Aerospace Journal vol. 8, Issue 2, Dec. 2015, 7 pages.

(Continued)

*Primary Examiner* — Michael N Orlando
*Assistant Examiner* — Joshel Rivera
(74) *Attorney, Agent, or Firm* — Yee & Associates, P.C.

(57) ABSTRACT

A system comprises a laser projector, an automated material placement head, and a laser inspection system. The laser projector is configured to project boundary projection line onto a part. The automated material placement head is configured to lay down a course of composite material. The laser inspection system is connected to the automated material placement head and configured to project a laser beam into a laser line parallel to the motion of the automated material placement head in laying the composite material.

20 Claims, 14 Drawing Sheets

(56) References Cited

U.S. PATENT DOCUMENTS

| | | |
|---|---|---|
| 7,439,547 B2 | 10/2008 | Kitagawa et al. |
| 7,489,392 B2 | 2/2009 | Engelbart et al. |
| 7,555,404 B2 | 6/2009 | Brennan et al. |
| 7,576,850 B2 | 8/2009 | Engelbart et al. |
| 7,626,692 B2 | 12/2009 | Engelbart et al. |
| 7,678,214 B2 | 3/2010 | Engelbart et al. |
| 7,688,434 B2 | 3/2010 | Engelbart et al. |
| 7,712,502 B2 | 5/2010 | Engelbart et al. |
| 7,769,224 B2 | 8/2010 | Engelbart et al. |
| 7,807,002 B2 | 10/2010 | Engelbart et al. |
| 7,889,907 B2 | 2/2011 | Engelbart et al. |
| 7,978,328 B2 | 7/2011 | Engelbart et al. |
| 7,983,469 B2 | 7/2011 | Engelbart et al. |
| 8,068,659 B2 | 11/2011 | Engelbart et al. |
| 8,094,921 B2 | 1/2012 | Engelbart et al. |
| 8,184,281 B2 | 5/2012 | Engelbart et al. |
| 8,377,239 B2 | 2/2013 | Engelbart et al. |
| 8,524,021 B2 | 9/2013 | Engelbart et al. |
| 8,668,793 B2 | 3/2014 | Engelbart et al. |
| 8,687,872 B2 | 4/2014 | Engelbart et al. |
| 8,695,669 B2 | 4/2014 | Engelbart et al. |
| 8,753,458 B2 | 6/2014 | Engelbart et al. |
| 8,770,248 B2 | 7/2014 | Engelbart et al. |
| 8,934,702 B2 | 1/2015 | Engelbart et al. |
| 8,983,171 B2 | 3/2015 | Toledano |
| 9,027,621 B2 | 5/2015 | Engelbart et al. |
| 2005/0082262 A1* | 4/2005 | Rueb .................. B25H 7/00 219/121.6 |
| 2006/0108948 A1 | 5/2006 | Shin et al. |
| 2007/0097359 A1 | 5/2007 | Engelbart et al. |
| 2014/0081444 A1 | 3/2014 | Rudberg et al. |
| 2015/0254835 A1 | 9/2015 | Dorris et al. |
| 2016/0097728 A1 | 4/2016 | Engelbart et al. |

OTHER PUBLICATIONS

Rudberg et al., "Incorporation of Laser Projectors in Machine Cell Controller Reduces Ply Boundary Inspection Time, On-Part Course Identification and Part Probing", Electroimpact Inc., SAE International, Aerospace journal, vol. 5, Issue 1, Oct. 2015, pp. 74-78.

European Patent Office Extended Search Report, dated Sep. 3, 2018, regarding application No. 18156619.1, 11 pages.

\* cited by examiner

MEASUREMENT OF PLY BOUNDARIES

BACKGROUND INFORMATION

1. Field

The present disclosure relates generally to inspection, and more specifically, to inspection of composite materials. Still more particularly, the present disclosure relates to ply boundary measurements on composite plies.

2. Background

Composite materials are laid down by an automatic material placement process into layers, called plies. After laying down a ply, the edge of the ply is inspected. Measurement of ply edges is a manual inspection that is completed after laying down the ply and prior to laying down the next ply.

To inspect a ply edge, a laser line is projected around the ply by a laser projection system, for example with commercially available systems such as Virtek® LaserEdge® offered by Gerber Technology (Tolland, Conn.) or the FARO® Tracer™ system offered by FARO Technologies (Lake Mary, Fla.). The laser line is representative of the desirable locations for the edges of the ply. The operator visually observes whether the edge of the ply contacts the laser line. The operator also measures a difference between the edge of the ply and the projected laser line. The laser projection system may also be known as an optical layup template (OLT) system. The operator continues this measurement around the edges of the ply.

The manual inspection may take an undesirable amount of time to complete. Additional plies are not laid down until inspection is completed. Manual inspection of ply edges adds an undesirable amount of time to the overall manufacturing time. Such an approach may also introduce human error in the inspection measurements.

The projected laser line often appears faint against the black composite background. The projected laser line may be difficult for the inspector to see. This adds more time to the inspection process.

In addition to the actual inspection, considerable time is spent in providing acceptable physical access to the surface of the part. For large parts, such as fuselage barrel sections, lifting platforms may be used to provide inspection adequate access to the part surface. Moving the lifting platforms relative to large parts may add an undesirable amount of time to the inspection process and add to production equipment costs. Therefore, it would be desirable to have a method and apparatus that takes into account at least some of the issues discussed above, as well as other possible issues.

SUMMARY

An illustrative example of the present disclosure provides a system. The system comprises a laser projector, an automated material placement head, and a laser inspection system. The laser projector is configured to project a boundary projection line onto a part. The automated material placement head is configured to lay down a course of composite material. The laser inspection system is connected to the automated material placement head and configured to project a laser beam into a laser line parallel to the motion of the automated material placement head in laying the composite material.

Another illustrative example of the present disclosure provides a method. A course of composite material is laid onto a part using an automated material placement head. A boundary projection line is projected onto the part. A laser inspection system connected to the automated material placement head projects a laser beam into a laser line, wherein the laser line is parallel to the motion of the automated material placement head to lay the course of composite material. A set of images of the laser line overlapping an edge of the course and the boundary projection line is taken. Whether a value representative of a distance between the boundary projection line and the edge of the course is below a threshold is determined using the set of images.

A further illustrative example of the present disclosure provides another method. A plurality of courses of composite material is laid down onto a part using an automated material placement head. A number of boundary projection lines is sequentially projected onto the part. A set of images for each course in the plurality of courses is taken, wherein each set of images is a set of images of an edge of a respective course, and wherein each set of images includes a respective boundary projection line of the number of boundary projection lines and a laser line projected perpendicular to and overlapping the edge of the respective course. A distance between the edge of the respective course and the respective boundary projection line for each course of the plurality of courses is determined using the set of images.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
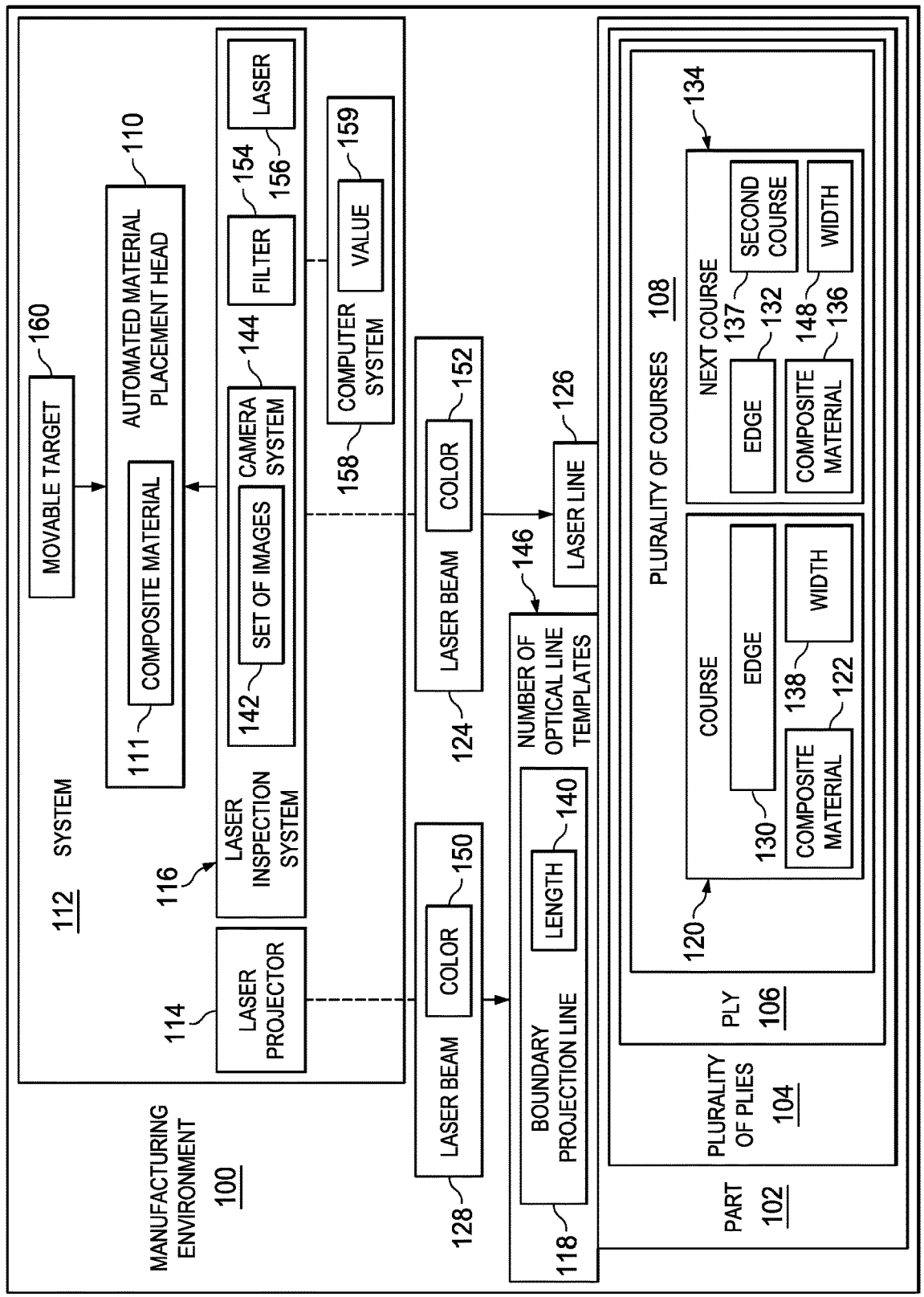
FIG. 1 is an illustration of a block diagram of a manufacturing environment in accordance with an illustrative embodiment.

The illustrative embodiments recognize and take into account one or more different considerations. For example, the illustrative embodiments recognize and take into account that in automated material placement processes, the perimeter of a fiber-placed or tape-placed ply desirably falls within a defined distance from the nominal end of the ply as defined in the CAD model. The illustrative embodiments recognize and take into account that this measurement is called "ply boundary", or "end placement", measurement. The illustrative embodiments recognize and take into account that all plies have desirable ply boundaries, not only plies that cover an entire tool, but also smaller, detail plies that are located within the larger plies. An example of the use of such smaller plies is the build-up or reinforcement for what will be an aircraft fuselage window frame or door frame.

The illustrative embodiments recognize and take into account that in a conventional process, when the ply is completed, the placement process is halted and a laser projector is used to project an outline of the ply edge as a boundary projection line. The illustrative embodiments recognize and take into account that this conventional boundary projection line extends around the entire edge of the ply. The illustrative embodiments recognize and take into account that this boundary projection line is the nominal boundary based on the CAD model, and ideally the ply edge and projected boundary projection line coincide exactly.

The illustrative embodiments recognize and take into account that because there may be inconsistencies in placement or in the cutting of tows to length, a dimensional tolerance is allowed above and below the established nominal. The illustrative embodiments recognize and take into account that in conventional inspection, an inspector looks at the edge of the ply compared to the boundary projection line and takes measurements of any distance between the ply edge and the boundary projection line before the next ply is placed. The illustrative embodiments recognize and take into account that this conventional manual inspection process takes a considerable and undesirable amount of time. The illustrative embodiments recognize and take into account that conventional manual inspection processes for ply boundaries increases the overall manufacturing time by delaying laying down the future plies until inspection of the current ply is completed.

The illustrative embodiments recognize and take into account that composite materials are tough, light-weight materials created by combining two or more functional components. For example, a composite material may include reinforcing fibers bound in a polymer resin matrix. The fibers may be unidirectional or may take the form of a woven cloth or fabric. The fibers and resins are arranged and cured to form a composite material.

The illustrative embodiments recognize and take into account that using composite materials to create aerospace composite structures potentially allows for portions of an aircraft to be manufactured in larger pieces or sections. For example, a fuselage in an aircraft may be created in cylindrical sections and then assembled to form the fuselage of the aircraft. Other examples include, without limitation, wing sections joined to form a wing or stabilizer sections joined to form a stabilizer.

The illustrative embodiments recognize and take into account that in manufacturing composite structures, layers of composite material are typically laid up on a tool. The layers may be comprised of fibers in sheets. These sheets may take the form of fabrics, tape, tows, or other suitable forms. In some cases, resin may be infused or pre-impregnated into the sheets. These types of sheets are commonly referred to as "prepreg".

The different layers of prepreg may be laid up in different orientations and different numbers of layers may be used depending on the thickness of the composite structure being manufactured. These layers may be laid up by hand or using automated lamination equipment, such as a tape laminating machine or a fiber placement system.

After laying down the composite material, ply edges are inspected. If an inconsistency is identified, the composite structure may be reworked.

Referring now to the figures and, in particular, with reference to FIG. 1, an illustration of a block diagram of a manufacturing environment is depicted in accordance with an illustrative embodiment. Manufacturing and inspection steps are performed on structures in manufacturing environment 100. Part 102 having plurality of plies 104 is present within manufacturing environment 100.

Ply 106 of plurality of plies 104 is laid down and inspected within manufacturing environment 100. Ply 106 is formed by laying down plurality of courses 108 using automated material placement head 110. Automated material placement head 110 lays down composite material 111 to form plurality of courses 108. It is desirable to inspect the boundary, or edge, of each course of plurality of courses 108.

Manufacturing environment 100 includes system 112. System 112 comprises laser projector 114, automated material placement head 110, and laser inspection system 116. Laser projector 114 is configured to project boundary projection line 118 onto part 102. Automated material placement head 110 is configured to lay down course 120 of composite material 122. Laser inspection system 116 is connected to automated material placement head 110. Laser inspection system 116 is configured to project laser beam 124 into laser line 126 parallel to the motion of automated material placement head 110 in laying composite material 122.

As depicted, laser projector 114 forms laser beam 128 to project boundary projection line 118. Boundary projection line 118 is perceived as a line. However, boundary projection line 118 is created by a laser dot formed by laser beam 128 on part 102 moving quickly on part 102.

Boundary projection line 118 is representative of a desired location of at least a portion of an edge of at least one course of composite material of part 102. In one illustrative example, boundary projection line 118 is representative of a desired location of at least a portion of edge 130 of course 120 of composite material 122 of part 102. In another illustrative example, boundary projection line 118 is representative of a desired location of at least a portion of edge 132 of next course 134 of composite material 136 of part 102. In some illustrative examples, next course 134 may be referred to as second course 137.

Edge 130 may be considered a start edge of course 120 or an end edge of course 120. A start edge is laid down first by automated material placement head 110. The start edge is created by cutting the end edge of a previous course. Afterwards, automated material placement head 110 moves laterally and begins laying course 120 by first laying the start edge. An end edge may be laid down as a last portion of a course. When edge 130 is the end edge of course 120, edge 130 is cut by automated material placement head 110 to finish laying course 120.

Likewise, edge 132 may be considered the start edge of next course 134 or the end edge of next course 134. When edge 132 is the end edge of next course 134, edge 132 is cut by automated material placement head 110 to finish laying next course 134.

When boundary projection line 118 is representative of a desired location of at least a portion of edge 130 of course 120, boundary projection line 118 is positioned relative to edge 130 of course 120. Course 120 has width 138. Width 138 is any desirable width for composite material 122. For example, width 138 may be selected from two inches, four inches, six inches, eight inches, twelve inches, or any other desirable width for composite materials.

Length 140 of boundary projection line 118 is one of less than, equal to, or greater than width 138 of course 120. Length 140 of boundary projection line 118 is configured such that set of images 142 of boundary projection line 118 captured by camera system 144 of laser inspection system 116 is sufficiently bright to perform a measurement of a distance from edge 130 of course 120 to boundary projection line 118. Set of images 142 includes one or more images. Camera system 144 includes one or more cameras. Length 140 of boundary projection line 118 is less than a boundary of ply 106.

Boundary projection line 118 is part of number of boundary projection lines 146. As used herein, a "number of" items is one or more items. Thus, number of boundary projection lines 146 is one or more boundary projection lines.

Number of boundary projection lines 146 includes any desirable quantity of boundary projection lines for measurement of the edges of each of plurality of courses 108 of ply 106. In some illustrative examples, number of boundary projection lines 146 has the same lengths. In other illustrative examples, at least one boundary projection line of number of boundary projection lines 146 has a different length than the remaining boundary projection lines of number of boundary projection lines 146.

When length 140 of boundary projection line 118 is the same as width 138 of course 120, a subsequent boundary projection line of number of boundary projection lines 146 is projected relative to next course 134. In these illustrative examples, the subsequent boundary projection line may have a length substantially the same as width 148 of next course 134. When each of number of boundary projection lines 146 has the same length as the widths of plurality of courses 108, the quantity of boundary projection lines for inspecting the edges of plurality of courses 108 is the same as the quantity of courses in plurality of courses 108.

Laser projector 114 creates laser beam 128 having color 150. Laser inspection system 116 creates laser beam 124 having color 152. In some illustrative examples, laser projector 114 and laser inspection system 116 create laser beams of different colors. In one illustrative example, color 150 is green while color 152 is red. When color 150 and color 152 are different, color 150 and color 152 may be contrasted enough to determine line intersections. When color 150 and color 152 are different, set of images 142 may be filtered to identify laser beam 128 and laser beam 124.

In some illustrative examples, laser inspection system 116 has camera system 144, filter 154, and laser 156. Laser 156 forms laser beam 124. Camera system 144 is configured to take set of images 142 of laser line 126 overlapping edge 130 of course 120 and boundary projection line 118.

Filter 154 may be either hardware or software. In some illustrative examples, filter 154 is a physical filter attached to camera system 144. In other illustrative examples, filter 154 is a software filter applied to set of images 142. When filter 154 is a software filter, filter 154 may be part of computer system 158, rather than laser inspection system 116. In some illustrative examples, filter 154 is the same color as one of boundary projection line 118 projected by laser projector 114 or laser beam 124 projected by the laser inspection system 116.

In some illustrative examples, system 112 also includes computer system 158. Computer system 158 is configured to determine value 159 representative of a distance between edge 130 of course 120 and boundary projection line 118 using set of images 142.

Composite material 122 may take any desirable form. Depending on the form of composite material 122, edge 130 is formed by one or more cuts of composite material 122. For example, when composite material 122 is prepreg tape, edge 130 is formed by one or more blunt cuts. For example, edge 130 may be a complex shape formed by multiple cuts. In another example, edge 130 may be substantially straight but angled relative to boundary projection line 118. When composite material 122 is a plurality of tows, each fiber is cut separately.

Value 159 determined by computer system 158 is a representative value. The distance between edge 130 of course 120 and boundary projection line 118 may not be constant across all of boundary projection line 118. For example, when edge 130 has a complex shape, the distance between edge 130 and boundary projection line 118 may change along boundary projection line 118 due to the complexity of the shape. As another example, when edge 130 is angled relative to boundary projection line 118, the distance between edge 130 and boundary projection line 118 may change along boundary projection line 118 due to the angle.

In some illustrative examples, value 159 determined by computer system 158 is determined based only on one measurement. For example, value 159 determined by computer system 158, may be determined using a distance between an intersection of laser line 126 with edge 130 and an intersection of laser line 126 with boundary projection line 118. In other illustrative examples, value 159 determined by computer system 158, is determined based on more than one measurement. For example, value 159 determined by computer system 158, may be determined using intersections for laser line 126 and other laser lines not depicted in FIG. 1.

Value 159 is used to determine if location of edge 130 is an acceptable location. Value 159 is used to determine if a variation in the location of edge 130 of course 120 compared to an expected location of edge 130 is acceptable.

In some illustrative examples, value 159 is an absolute value. In these examples, value 159 is a positive number regardless of if course 120 is longer or shorter than desired.

In other illustrative examples, value 159 is positive or negative depending on if course 120 is longer or shorter than desired. For example, if laser line 126 encounters edge 130 before encountering boundary projection line 118, course 120 is shorter than desired. When course 120 is shorter than desired, value 159 may be negative. As another example, if laser line 126 encounters boundary projection line 118 before encountering edge 130, course 120 is longer than desired. When course 120 is shorter than desired, value 159 may be positive.

In some illustrative examples, tolerances for the location of edge 130 may be the same whether course 120 is longer than desired or shorter than desired. In other illustrative examples, a tolerance in one direction, shorter or longer, is larger than a tolerance in the other direction for course 120. For example, a tolerance for a longer course may be greater than a tolerance for a shorter course. In other illustrative examples, a tolerance for a shorter course may be greater than a tolerance for a longer course.

Computer system 158 may be used to determine if value 159 is acceptable. Computer system 158 may be used to compare value 159 to a threshold.

The threshold is set based on at least one tolerance. When the tolerance for too long a course is different than the tolerance for too short a course, the threshold is based on either the tolerance for too long a course or too short a course. When the tolerances are the same, the threshold may be an absolute value representing both tolerances. In some illustrative examples, the tolerances may be the same, but the threshold is one of positive or negative depending on which tolerance the threshold represents.

The tolerance may be for course 120 specifically, for ply 106 as a whole, for composite material 111, or for any other desirable portion of part 102. The tolerance may take into account manufacturing variations, performance characteristics for part 102, desired dimensions for part 102, or any other factors related to part 102 or the manufacturing processes for part 102. In some illustrative examples, computer system 158 selects an appropriate threshold for edge 130 from a plurality of thresholds.

In some illustrative examples, computer system 158 may also send instructions to at least one of automated material placement head 110, laser inspection system 116, or laser projector 114. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

In some illustrative examples, system 112 also includes movable target 160 connected to automated material placement head 110. In some illustrative examples, laser projector 114 changes its projection based on a location of movable target 160. For example, laser projector 114 may change from projecting boundary projection line 118 to another boundary projection line of number of boundary projection lines 146.

In some illustrative examples, movable target 160 is a reflective laser target (small silver disc) that is mounted on a holder. Laser projector 114 confirms the location of automated material placement head 110 by detecting movable target 160 through reflection of laser beam 128 back to the window of laser projector 114.

Movable target 160 may be rotatable relative to automated material placement head 110 such that movable target 160 does not interact with laser beam 128. For example, movable target 160 may be rotatable up to ninety degrees such that movable target 160 only intersects boundary projection line 118 once.

The illustration of manufacturing environment 100 in FIG. 1 is not meant to imply physical or architectural limitations to the manner in which an illustrative embodiment may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

For example, movable target 160 may not be present in system 112. Instead, laser projector 114 may be controlled or triggered through alternate means. For example, laser projector 114 may change from boundary projection line 118 to another of number of boundary projection lines 146 based on operator input.

In another example, filter 154 is not present within laser inspection system 116. Instead, filter 154 may be a software implementation in computer system 158. When filter 154 is implemented in software on computer system 158, filter 154 may be an example of post image processing.

In a further example, although not depicted in FIG. 1, laser line 126 may be one of a plurality of laser lines. One non-limiting example of a physical implementation of a plurality of laser lines is shown below in FIG. 7.

Further, although not depicted in FIG. 1, a perimeter of ply 106 may be inspected by inspecting respective edges of plurality of courses 108. For example, both start edges and end edges of each of plurality of courses 108 may be inspected using laser inspection system 116. An inspection may be performed at least one of while laying down plurality of courses 108 or after having laid down plurality of courses 108.

Figure 2:
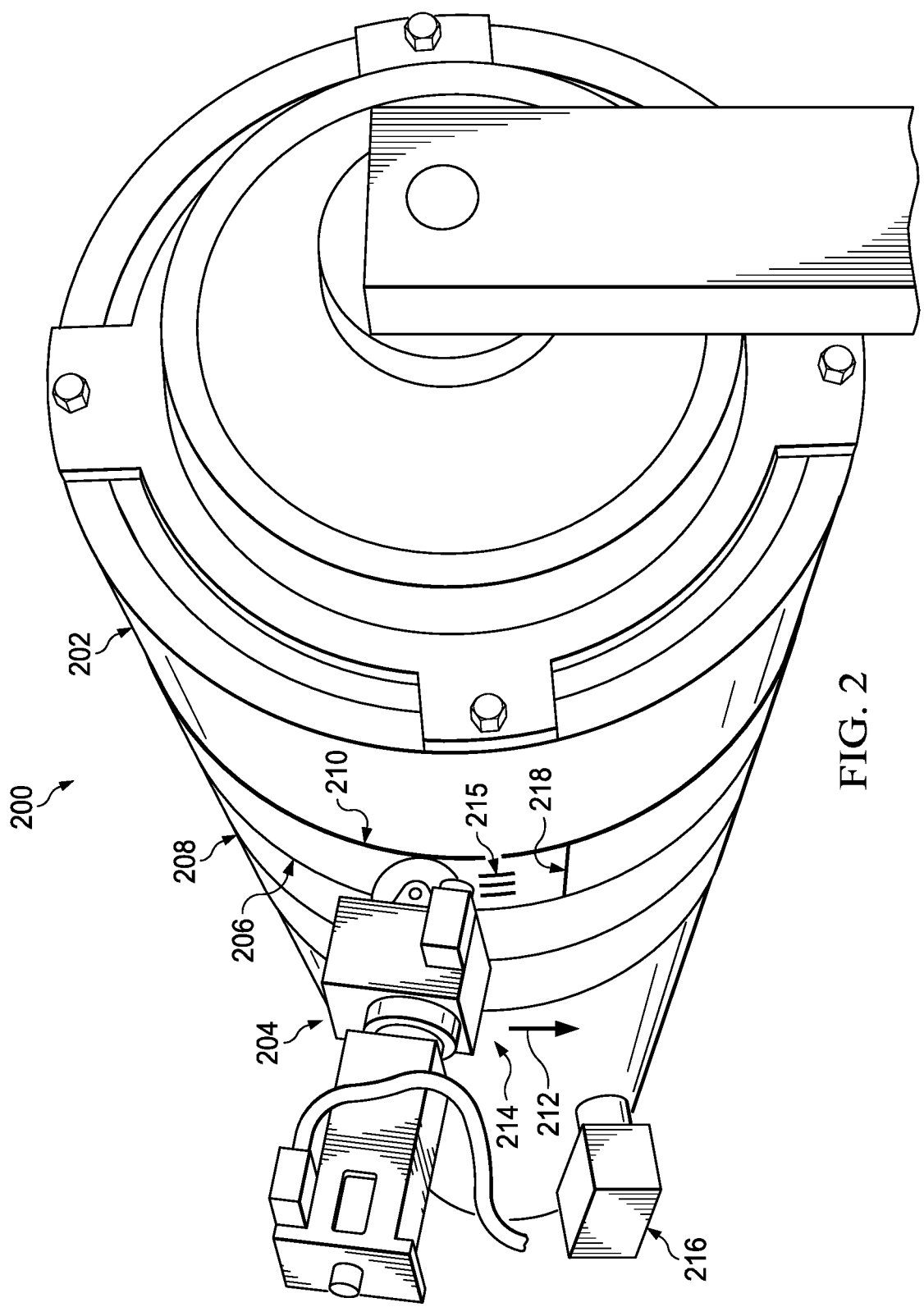
FIG. 2 is an illustration of an isometric view of a manufacturing environment in accordance with an illustrative embodiment.

Turning now to FIG. 2, an illustration of an isometric view of a manufacturing environment is depicted in accordance with an illustrative embodiment. Manufacturing environment 200 is a physical embodiment of manufacturing environment 100 of FIG. 1. Part 202 is a physical implementation of part 102 of FIG. 1. Automated material placement head 204 is a physical implementation of automated material placement head 110 of FIG. 1.

In manufacturing environment 200, automated material placement head 204 lays plurality of courses 206 of composite material 208 to form ply 210. Automated material placement head 204 moves in direction 212 to lay composite material 208. Laser inspection system 214 is connected to automated material placement head 204. Laser inspection system 214 forms a laser beam. The laser beam is projected into laser line 215 parallel to the motion of automated material placement head 204 in laying the composite material Laser projector 216 is positioned in manufacturing environment 200 such that laser projector 216 may project a laser beam onto part 202. As depicted, laser projector 216 projects boundary projection line 218 onto part 202. Boundary projection line 218 is representative of a desired location of at least a portion of an edge of at least one course of composite material 208 of part 202.

Figure 3:
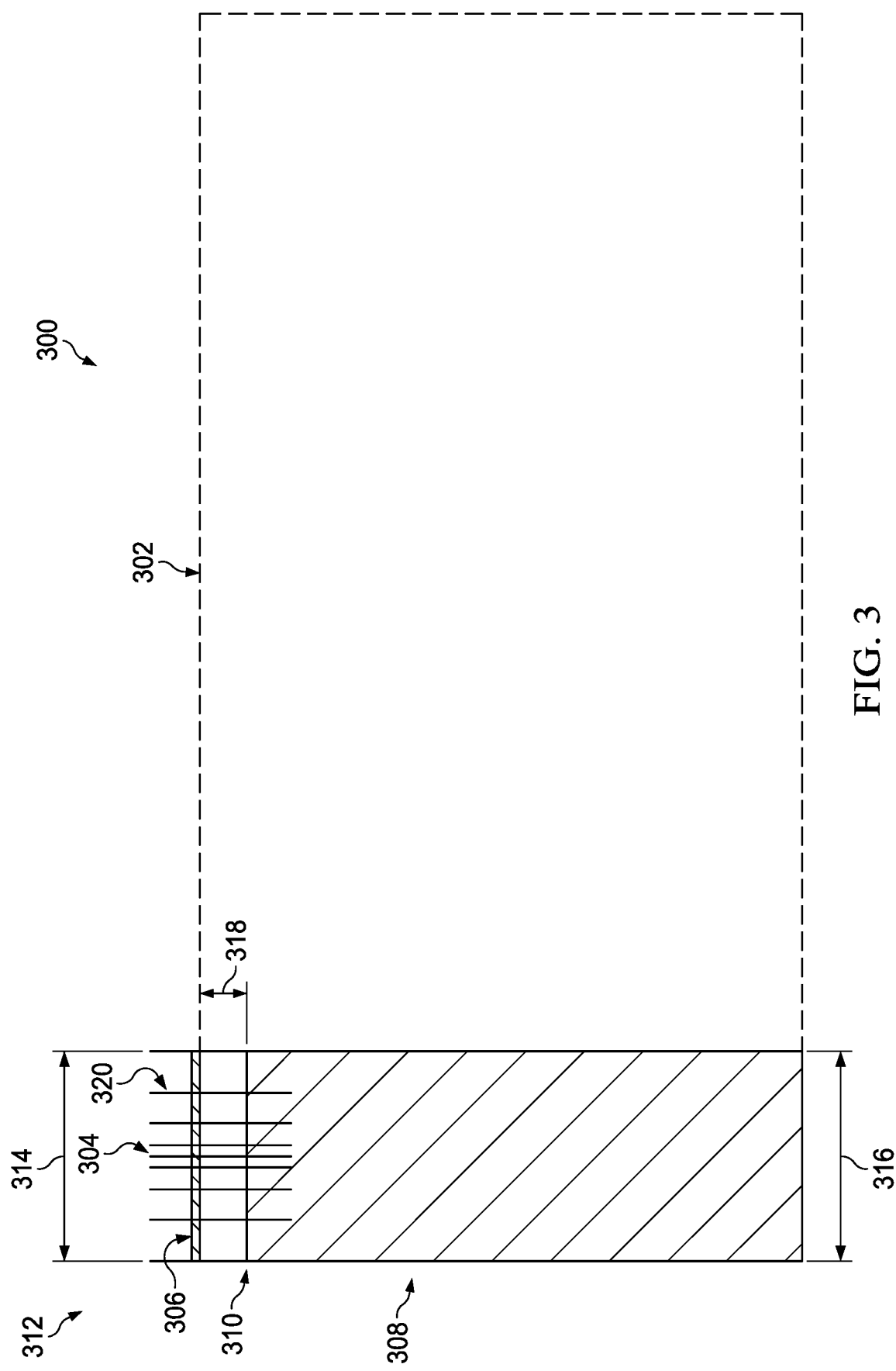
FIG. 3 is an illustration of a laser line and a boundary projection line positioned relative to a ply in accordance with an illustrative embodiment.

Turning now to FIG. 3, an illustration of a laser line and a boundary projection line positioned relative to a ply is depicted in accordance with an illustrative embodiment. In view 300, ply 302 is a physical implementation of ply 106 of FIG. 1. Laser line 304 and boundary projection line 306 positioned relative to ply 302 are physical implementations of laser line 126 and boundary projection line 118 of FIG. 1.

Course 308 of ply 302 has been laid down by an automated material placement head (not depicted). In view 300, boundary projection line 306 is representative of a desired location of at least a portion of edge 310 of course 308 of part 312.

In this illustrated example, length 314 of boundary projection line 306 is the same as width 316 of course 308 of ply 302. In other non-depicted examples, length 314 may instead be greater or less than width 316 of course 308 of ply 302. Length 314 of boundary projection line 306 is selected such that images of boundary projection line 306 captured by a camera system of a laser inspection system is sufficiently bright to perform a measurement of distance 318 from edge 310 of course 308 to boundary projection line 306.

As depicted, laser line 304 is one of plurality of laser lines 320. The position, sizing, and spacing between plurality of laser lines 320 may be variable. In other illustrative examples, the plurality of laser lines may be different than plurality of laser lines 320 depicted.

A value representative of distance 318 between edge 310 of course 308 and boundary projection line 306 is determined using a set of images of boundary projection line 306. As depicted, course 308 is shorter than boundary projection line 306.

In some illustrative examples, the value representative of distance 318 is negative because course 308 is shorter than boundary projection line 306. In other illustrative examples, the value representative of distance 318 is positive. In these illustrative examples, the value representative of distance 318 is an absolute value.

A value representative of distance 318 will be compared to a threshold. In some illustrative examples, the threshold is a positive value. In other illustrative examples, the threshold is negative value. If the threshold is a negative value, the threshold may be an outermost acceptable value for a distance between the location of edge 310 that is shorter than desired. If the value is below the threshold with a negative value, edge 310 is considered unacceptably short. If the value representative of distance 318 is below the threshold, distance 318 is considered an unacceptable variation in the location of edge 310 of course 308. When the value representative of distance 318 is below the threshold, course 308 may be reworked.

When the threshold is a negative number, the threshold may be a portion of a tolerance band. The tolerance band may be a region between the threshold and a second threshold. The second threshold is a positive number and represents an outermost acceptable value for a difference between a course that is longer than desired and the desired location.

Values between the threshold and the second threshold may be said to be within the tolerance band. The values within the tolerance band are representative of acceptable locations for edge 310. When the tolerance band is presented, the value representative of distance 318 may be compared to both the threshold and the second threshold.

In some illustrative examples, the value representative of distance 318 is an absolute value. When the value is an absolute value, the threshold is a positive number. In these illustrative examples, if the value representative of distance 318 is below the threshold, distance 318 is an acceptable variation in the location of edge 310 of course 308. If the value representative of distance 318 is above the threshold, distance 318 is considered an unacceptable variation in the location of edge 310 of course 308. When the value representative of distance 318 is above the threshold, course 308 may be reworked.

Generally, as described, if a value is below a negative threshold, the value is considered unacceptable. Generally, as described, if a value is a positive value and below a positive threshold, the value is considered acceptable.

Although course 308 is depicted as being a first course in ply 302, course 308 may have any desirable position within ply 302. Further, set of images of boundary projection line 306 may be taken at any desirable time relative to laying down course 308. For example, the set of images may be taken immediately after laying down course 308.

In another example, the set of images may be taken after laying down multiple courses including course 308. For example, taking the set of images of course 308 may be taken as part of an inspection step for a plurality of courses. The plurality of courses may be any desirable quantity of courses. In some examples, the plurality of courses includes all courses in ply 302.

For ease of explanation, in FIG. 3, edge 310 is substantially straight. Further, edge 310 is substantially parallel to boundary projection line 306. Thus, distance 318 is substantially constant across boundary projection line 306. A value representative of distance 318 at any point along boundary projection line 306 may be substantially the same as any other value representative of distance 318 along boundary projection line 306. Further, an average of measurements along boundary projection line 306 to form a value representative of distance 318 would be substantially the same as any of the measurements.

However, edge 310 may take any type of shape depending on composite type, type of automated material placement head, and desired shape. In other non-depicted illustrative examples, edge 310 may have any desirable shape. In other illustrative examples, distance 318 between edge 310 and boundary projection line 306 may not be substantially constant across boundary projection line 306. For example, edge 310 may be slanted, curved, crenulated, stair-stepped, angled, or have any other shape.

In some illustrative examples, multiple measurements of distance 318 may be taken. The multiple measurements of distance 318 may each be a value representative of distance 318 compared to a threshold. The threshold may be selected based on known variations in manufacturing. The threshold may vary depending on the location of a measurement along boundary projection line 306 to take into account a shape of edge 310.

In other illustrative examples, the multiple measurements of distance 318 may be averaged to form a value representative of distance 318. This value representative of distance 318 is compared to a threshold. The threshold may take into account expected variation along edge 310 due to the shape of edge 310.

Figure 4:
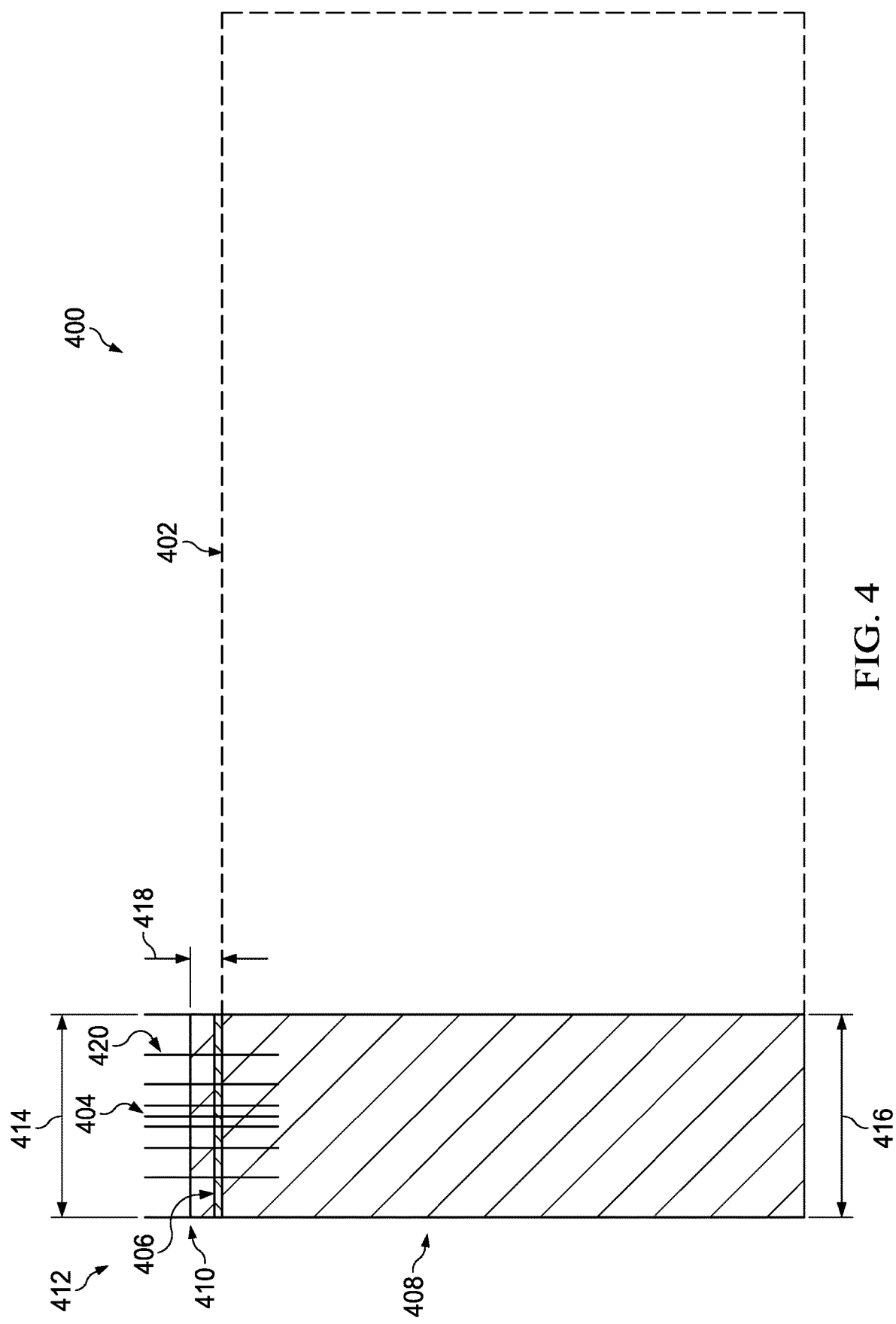
FIG. 4 is an illustration of a laser line and a boundary projection line positioned relative to a ply in accordance with an illustrative embodiment.

Turning now to FIG. 4, an illustration of a laser line and a boundary projection line positioned relative to a ply is depicted in accordance with an illustrative embodiment. In view 400, ply 402 is a physical implementation of ply 106 of FIG. 1. Laser line 404 and boundary projection line 406 positioned relative to ply 402 are physical implementations of laser line 126 and boundary projection line 118 of FIG. 1.

Course 408 of ply 402 has been laid down by an automated material placement head (not depicted). In view 400, boundary projection line 406 is representative of a desired location of at least a portion of edge 410 of course 408 of part 412.

In this illustrated example, length 414 of boundary projection line 406 is the same as width 416 of course 408 of ply 402. In other non-depicted examples, length 414 may instead be greater or less than width 416 of course 408 of ply 402. Length 414 of boundary projection line 406 is selected such that images of boundary projection line 406 captured by a camera system of a laser inspection system is sufficiently bright to perform a measurement of distance 418 from edge 410 of course 408 to boundary projection line 406.

As depicted, laser line 404 is one of plurality of laser lines 420. The position, sizing, and spacing between plurality of laser lines 420 may be variable. In other illustrative examples, the plurality of laser lines may be different than plurality of laser lines 420 depicted.

A value representative of distance 418 between edge 410 of course 408 and boundary projection line 406 is determined using a set of images of boundary projection line 406. As depicted, course 408 is longer than boundary projection line 406.

The value representative of distance 418 is positive. In some illustrative examples, the value representative of distance 418 is an absolute value.

A value representative of distance 418 will be compared to a threshold. The threshold is a positive value.

In some illustrative examples, the threshold may be an outermost acceptable value for a distance between the location of edge 410 that is longer than desired. In these illustrative examples, the threshold may be a threshold of a tolerance band. The tolerance band may be a region between the threshold and a second threshold. The second threshold is a negative number and represents an outermost acceptable value for a difference between a course that is shorter than desired and the desired location. When the value is an absolute value, the threshold is applied to courses that are longer or shorter than the desired location.

If a value representative of distance 418 is below the threshold, distance 418 is an acceptable variation in the location of edge 410 of course 408. If a value representative of distance 418 is above the threshold, distance 418 is considered an unacceptable variation in the location of edge 410 of course 408. When a value representative of distance 418 is above the threshold, course 408 may be reworked.

Although course 408 is depicted as being a first course in ply 402, course 408 may have any desirable position within ply 402. Further, set of images of boundary projection line 406 may be taken at any desirable time relative to laying down course 408. For example, the set of images may be taken immediately after laying down course 408.

In another example, the set of images may be taken after laying down multiple courses including course 408. For example, taking the set of images of course 408 may be taken as part of an inspection step for a plurality of courses. The plurality of courses may be any desirable quantity of courses. In some examples, the plurality of courses includes all courses in ply 402.

Figure 5:
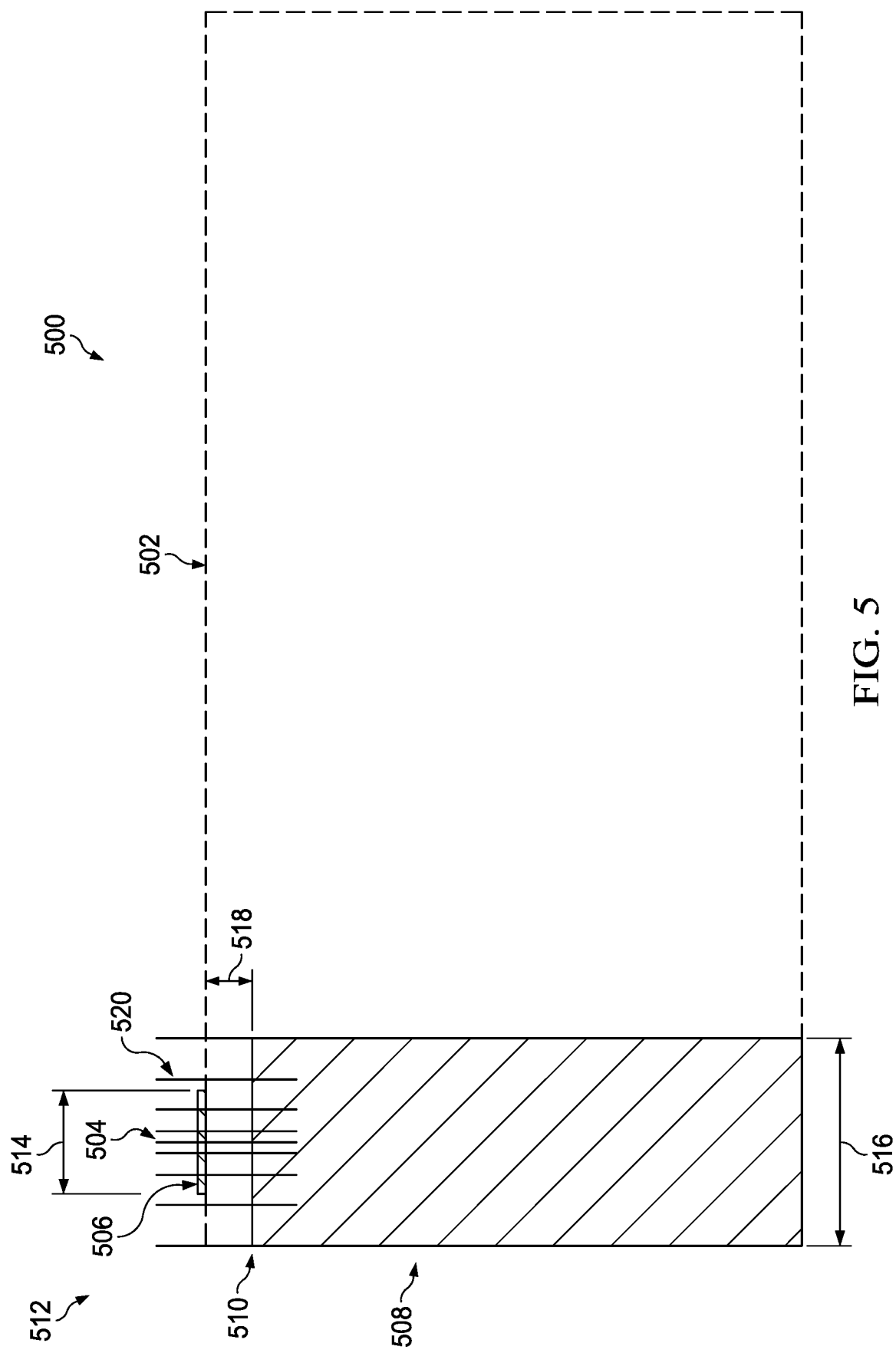
FIG. 5 is an illustration of a laser line and a boundary projection line positioned relative to a ply in accordance with an illustrative embodiment.

Turning now to FIG. 5, an illustration of a laser line and a boundary projection line positioned relative to a ply is depicted in accordance with an illustrative embodiment. In view 500, ply 502 is a physical implementation of ply 106 of FIG. 1. Laser line 504 and boundary projection line 506 positioned relative to ply 502 are physical implementations of laser line 126 and boundary projection line 118 of FIG. 1.

Course 508 of ply 502 has been laid down by an automated material placement head (not depicted). In view 500, boundary projection line 506 is representative of a desired location of at least a portion of edge 510 of course 508 of part 512.

In this illustrated example, length 514 of boundary projection line 506 is less than width 516 of course 508 of ply 502. Length 514 is sufficient for a determination of distance 518 from edge 510 of course 508 to boundary projection line 506. For example, a value representative of distance 518 from edge 510 of course 508 to boundary projection line 506 may be determined at substantially the center of width 516 of course 508. Length 514 of boundary projection line 506 is selected such that images of boundary projection line 506 captured by a camera system of a laser inspection system is sufficiently bright to perform a measurement of distance 518 from edge 510 of course 508 to boundary projection line 506.

As depicted, laser line 504 is one of plurality of laser lines 520. The position, sizing, and spacing between plurality of laser lines 520 may be variable. In other illustrative examples, the plurality of laser lines may be different than plurality of laser lines 520 as depicted.

A value representative of distance 518 between edge 510 of course 508 and boundary projection line 506 is determined using a set of images of boundary projection line 506. As depicted, course 508 is shorter than boundary projection line 506.

In some illustrative examples, the value representative of distance 518 is negative because course 508 is shorter than boundary projection line 506. In other illustrative examples, the value representative of distance 518 is positive. In these illustrative examples, the value representative of distance 518 is an absolute value.

A value representative of distance 518 will be compared to a threshold. In some illustrative examples, the threshold is a positive value. In other illustrative examples, the threshold is a negative value. If the threshold is a negative value, the threshold may be an outermost acceptable value for a distance between the location of edge 510 that is shorter than desired. If the value is below the threshold with a negative value, edge 510 is considered unacceptably short. If the value representative of distance 518 is below the threshold, distance 518 is considered an unacceptable variation in the location of edge 510 of course 508. When the value representative of distance 518 is below the threshold, course 508 may be reworked.

When the threshold is a negative number, the threshold may be a portion of a tolerance band. The tolerance band may be a region between the threshold and a second threshold. The second threshold is a positive number and represents an outermost acceptable value for a difference between a course that is longer than desired and the desired location.

Values between the threshold and the second threshold may be said to be within the tolerance band. The values within the tolerance band are representative of acceptable locations for edge 510. When a tolerance band is presented, the value representative of distance 518 may be compared to both the threshold and the second threshold.

In some illustrative examples, the value representative of distance 518 is an absolute value. When the value is an absolute value, the threshold is a positive number. In these illustrative examples, if the value representative of distance 518 is below the threshold, distance 518 is an acceptable variation in the location of edge 510 of course 508. If the value representative of distance 518 is above the threshold, distance 518 is considered an unacceptable variation in the location of edge 510 of course 508. When the value representative of distance 518 is above the threshold, course 508 may be reworked.

Although course 508 is depicted as being a first course in ply 502, course 508 may have any desirable position within ply 502. Further, set of images of boundary projection line 506 may be taken at any desirable time relative to laying down course 508. For example, the set of images may be taken immediately after laying down course 508.

In another example, the set of images may be taken after laying down multiple courses including course 508. For example, the set of images of course 508 may be taken as part of an inspection step for a plurality of courses. The plurality of courses may be any desirable quantity of courses. In some examples, the plurality of courses includes all courses in ply 502.

Figure 6:
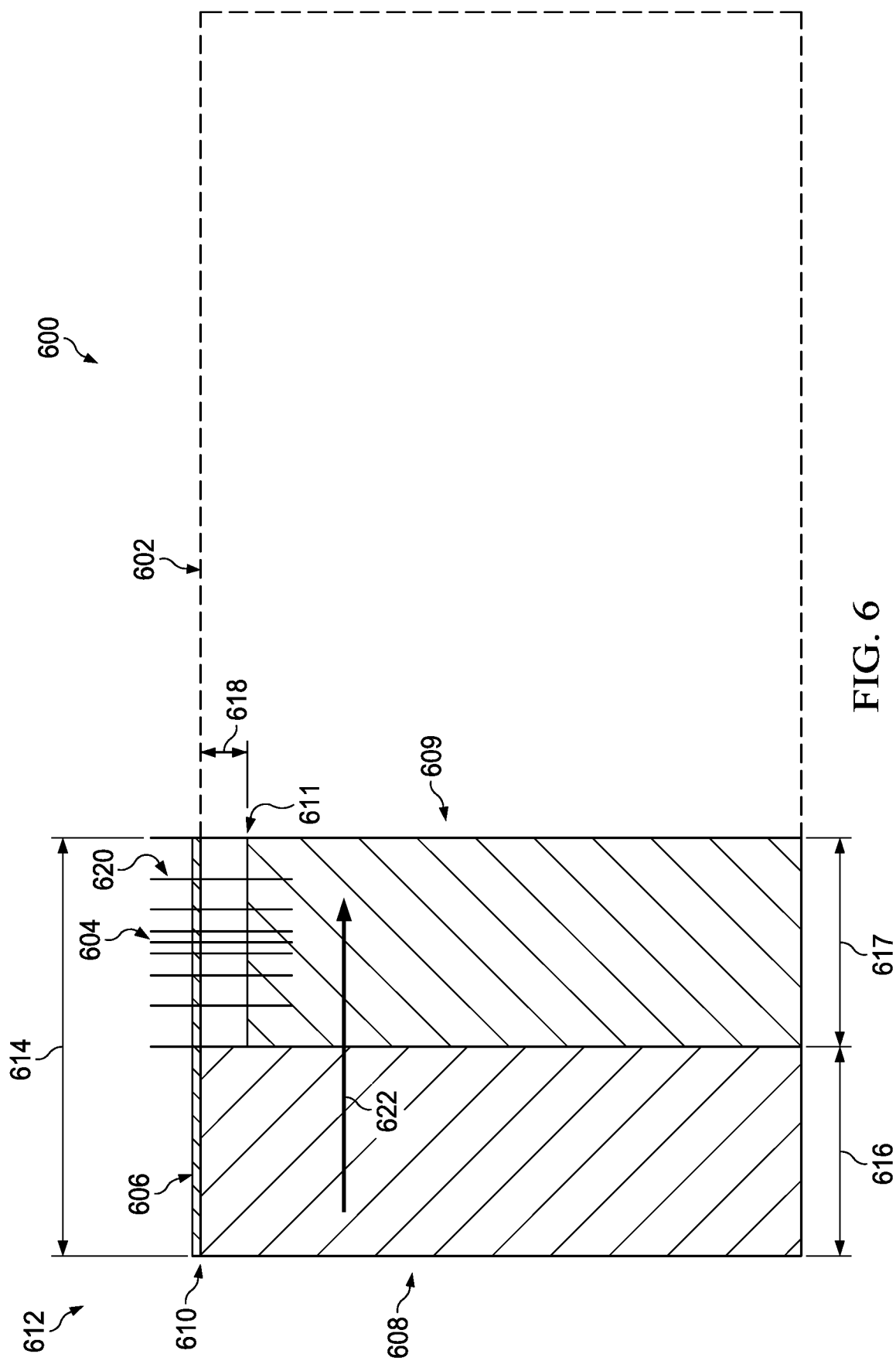
FIG. 6 is an illustration of a laser line and a boundary projection line positioned relative to a ply in accordance with an illustrative embodiment.

Turning now to FIG. 6, an illustration of a laser line and a boundary projection line positioned relative to a ply is depicted in accordance with an illustrative embodiment. In view 600, ply 602 is a physical implementation of ply 106 of FIG. 1. Laser line 604 and boundary projection line 606 positioned relative to ply 602 are physical implementations of laser line 126 and boundary projection line 118 of FIG. 1.

Course 608 and second course 609 of ply 602 have been laid down by an automated material placement head (not depicted). In view 600, boundary projection line 606 is representative of a desired location of at least a portion of edge 610 of course 608 and edge 611 of second course 609 of part 612.

In this illustrated example, length 614 of boundary projection line 606 is the same as the sum of width 616 of course 608 and width 617 of second course 609 of ply 602. Length 614 of boundary projection line 606 is selected such that images of boundary projection line 606 captured by a camera system of a laser inspection system is sufficiently bright to perform a measurement of distance 618 from edge 611 of second course 609 to boundary projection line 606.

As depicted, laser line 604 is one of plurality of laser lines 620. The position, sizing, and spacing between plurality of laser lines 620 may be variable. In other illustrative examples, the plurality of laser lines may be different than plurality of laser lines 620 as depicted.

A value representative of distance 618 between edge 611 of second course 609 and boundary projection line 606 is determined using a set of images of boundary projection line 606. As depicted, course 608 is a desired length, and second course 609 is shorter than boundary projection line 606. The value representative of distance 618 will be compared to a threshold.

As described above with regard to FIGS. 3-5, the threshold may be a positive number or a negative number. Further, as second course 609 is shorter than boundary projection line 606, the value representative of distance 618 may be represented as an absolute value or a negative value.

Generally, as described, if a value is below a negative threshold, the value is considered unacceptable. Generally, as described, if a value is a positive value and below a positive threshold, the value is considered acceptable.

Although second course 609 is depicted as being a second course in ply 602, second course 609 may have any desirable position within ply 602. Further, set of images of boundary projection line 606 may be taken at any desirable time relative to laying down course 608 and second course 609. For example, a set of images for course 608 may be taken immediately after laying down course 608 and a set of images for second course 609 may be taken immediately after laying down second course 609.

In another example, the set of images for course 608 and second course 609 may be taken after laying down course 608 and second course 609. For example, a set of images for course 608 is taken and then the automated material placement head is moved in direction 622 and a set of images for second course 609 is taken.

Direction 622 is perpendicular to movement of the automated material placement head in laying the composite material. For clarity of description, direction 622 may be referred to as a lateral direction. Direction 622 is lateral relative to the lengths of course 608 and second course 609.

In yet another example, the set of images for a plurality of courses may be taken as part of an inspection step for a plurality of courses. The plurality of courses may be any desirable quantity of courses. In some examples, the plurality of courses includes all courses in ply 602.

The illustrations in FIGS. 3-6 are not meant to imply physical or architectural limitations to the manner in which an illustrative embodiment may be implemented. For ease of explanation, in FIGS. 3-6, edge 310, edge 410, edge 510, edge 610, and edge 611 are substantially straight. However, each of edge 310, edge 410, edge 510, edge 610, and edge 611 may take any type of shape depending on composite type, type of automated material placement head, and desired shape. A respective threshold for any of edge 310, edge 410, edge 510, edge 610, or edge 611 may take into account a shape of the respective edge as described above with reference to FIG. 3.

Further, although each of edge 310, edge 410, edge 510, edge 610, and edge 611 are depicted as "end edges," the start edges of FIGS. 3-6 may also be inspected according to the illustrative examples. In some illustrative examples, the start edges of courses in FIGS. 3-6 may be inspected while laying down the courses. In other illustrative examples, the start edges of the courses in FIGS. 3-6 may be inspected after having laid down all desired courses in a respective ply.

Figure 7:
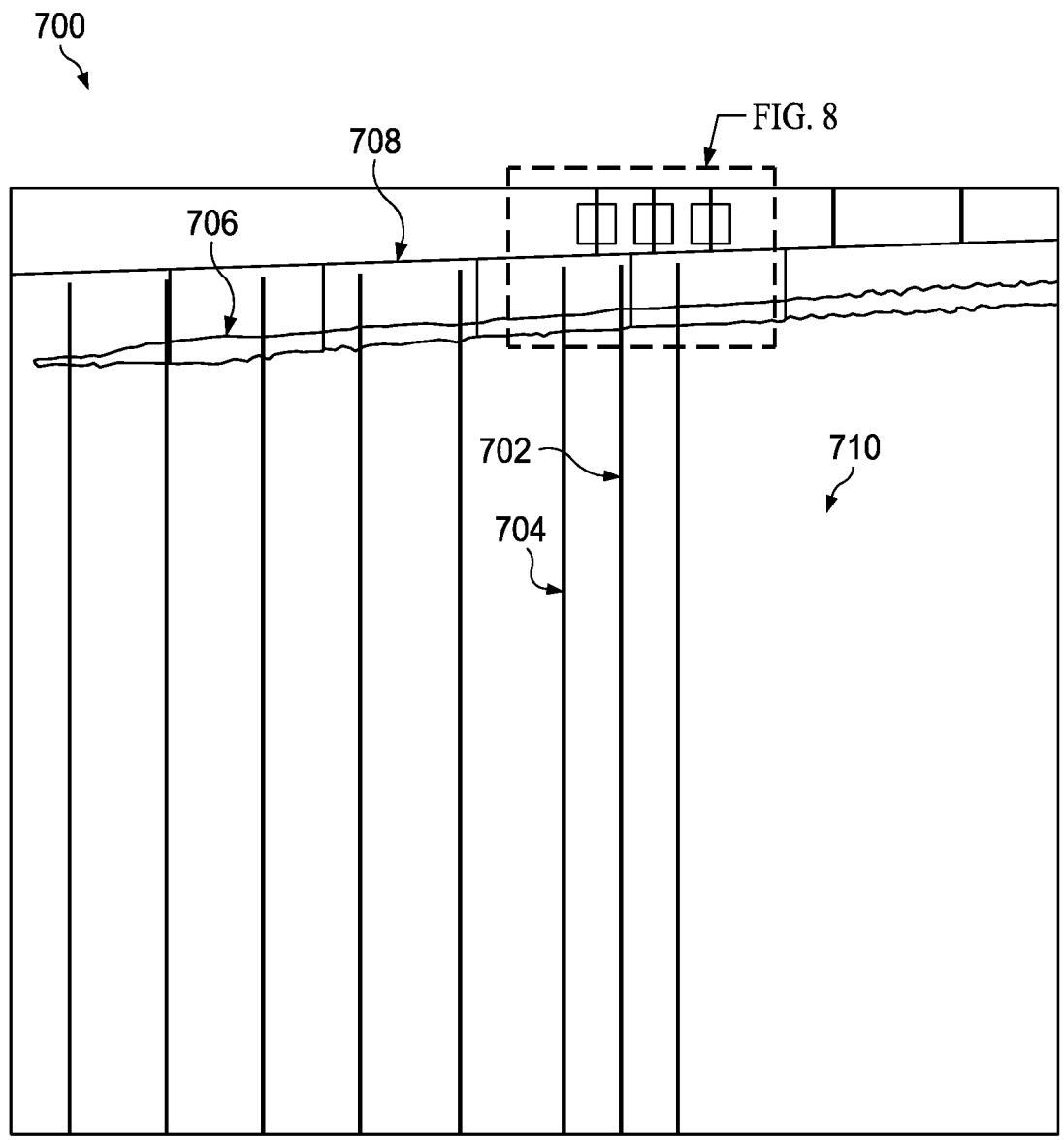
FIG. 7 is an illustration of an image of a ply edge, a laser line, and a boundary projection line in accordance with an illustrative embodiment.

Turning now to FIG. 7, an illustration of an image of a ply edge, a laser line, and a boundary projection line is depicted in accordance with an illustrative embodiment. Image 700 may be a physical implementation of set of images 142 of FIG. 1. Image 700 may be a set of images taken of view 400 in FIG. 4.

Image 700 may be generated using filters such as filter 154 of FIG. 1. Filters may be applied to view laser line 404 and boundary projection line 406 of FIG. 4 better within image 700. In some examples, filters may be applied to withdraw portions of part 412 of FIG. 4 from image 700.

Image 700 includes laser line 702 of plurality of laser lines 704. Laser line 702 is a filtered image representation of laser line 404. Boundary projection line 706 is a filtered image representation of boundary projection line 406. As depicted, boundary projection line 706 is an outline. In other illustrative examples, boundary projection line 706 may take any desirable form. For example, boundary projection line 706 may be a solid line rather than an outline. In some illustrative examples, shading may be present within the outline formed by boundary projection line 706.

The appearance of boundary projection line 706 is affected by at least one of characteristics of boundary projection line 406 or image processing applied to image 700. For example, the appearance of boundary projection line 706 may be affected by the thickness of boundary projection line 406, the filters applied to create image 700, and the speed of travel of the laser dot creating boundary projection line 406.

As depicted, edge 708 of ply 710 breaks plurality of laser lines 704. Plurality of laser lines 704 are jogged due to a break over edge 708 of ply 710.

A value representative of the distance between edge 708 and boundary projection line 706 may be determined in any desirable fashion and from any desirable quantity of measurements at any desirable locations along boundary projection line 706. In some illustrative examples, a measurement of the distance between edge 708 and boundary projection line 706 may be performed at a selected location on boundary projection line 706. For example, the measurement of the distance between edge 708 and boundary projection line 706 may be made at the beginning of boundary projection line 706, the end of boundary projection line 706, a center point of boundary projection line 706, or at any other desirable location of boundary projection line 706.

In another illustrative example, the measurement of the distance between edge 708 and boundary projection line 706 may be performed at a selected location relative to at least one of plurality of laser lines 704. For example, the measurement of the distance between edge 708 and boundary projection line 706 may be performed at the beginning of a respective jog of one of plurality of laser lines 704. As another example, the measurement of the distance between edge 708 and boundary projection line 706 may be performed at a midpoint between two laser lines of plurality of laser lines 704.

In yet a further illustrative example, the measurement of the distance between edge 708 and boundary projection line 706 may be performed at a location relative to a course of ply 710 being measured. For example, the measurement of the distance between edge 708 and boundary projection line 706 may be performed at a first side of the course, a second side of the course, a midpoint of the course, or any other desirable point along edge 708 of the course.

Figure 8:
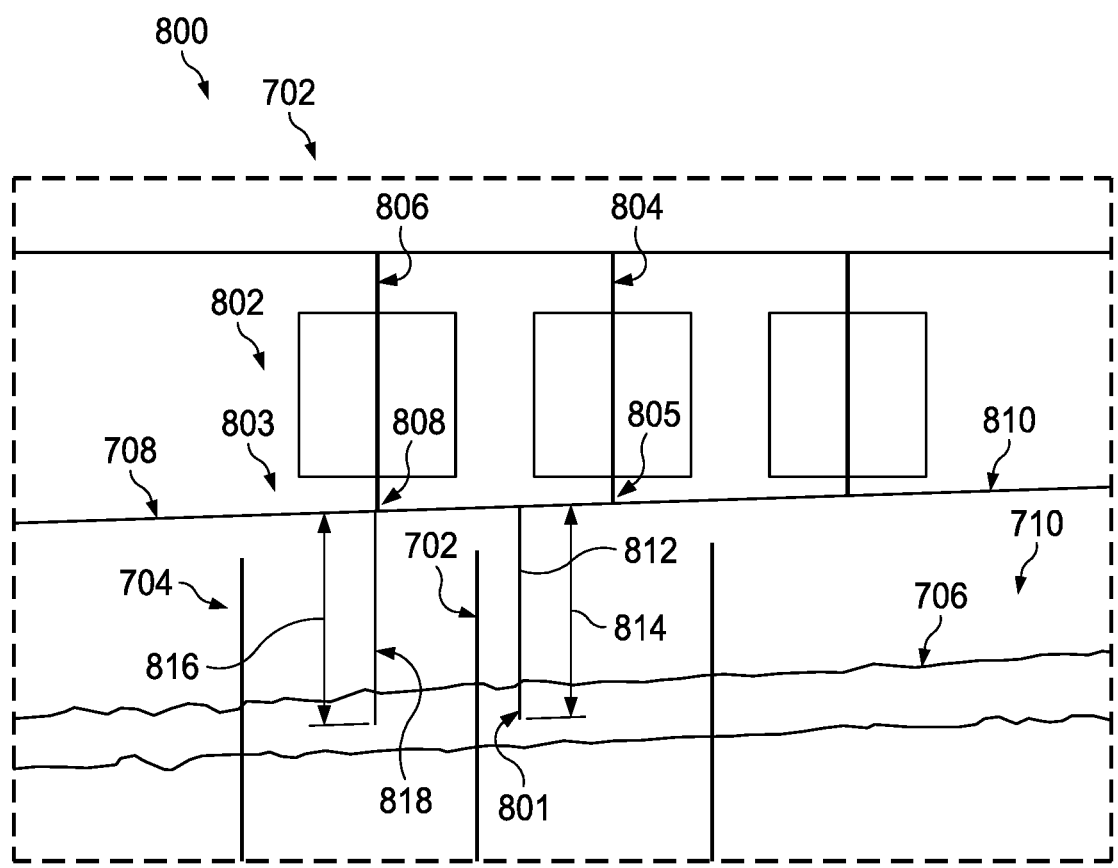
FIG. 8 is an illustration of an image of a ply edge, a laser line, and a boundary projection line in accordance with an illustrative embodiment.

Turning now to FIG. 8, an illustration of an image of a ply edge, a laser line, and a boundary projection line is depicted in accordance with an illustrative embodiment. View 800 is a view of a portion of image 700 within box 8 of FIG. 7.

A computer system, such as computer system 158 of FIG. 1, performs image analysis of image 700. Image analysis of image 700 is used to determine a value representative of a distance from edge 708 to boundary projection line 706. The following description is only one non-limiting example of the type of image analysis that may be performed on sets of images, such as image 700.

In the depicted illustrative example, the measurement of the distance from edge 708 is taken at centerpoint 801 of boundary projection line 706. Centerpoint 801 of boundary projection line 706, shown below edge 708 of ply 710, is determined. Centerpoint 801 may be determined by finding inside and outside edges of boundary projection line 706 using an edge detection algorithm, and then locating a midpoint. The skewed and irregular appearance of boundary projection line 706 is due to broadening of the shortened laser projector line. In some illustrative examples, boundary projection line 706 may instead have a more regular appearance.

Vertical lines 802 are a subset of plurality of laser lines 704. Vertical lines 802 are the projected lines of a laser beam. In some illustrative examples, vertical lines 802 are projected lines of a red detection laser. Jog 803 in vertical lines 802 occurs as each of vertical lines 802 breaks over edge 708 of ply 710. Jog 803 causes each vertical line of vertical lines 802 to appear as two portions; one portion below edge 708 and a second portion laterally offset and above edge 708.

As depicted, above edge 708 of ply 710, each of vertical lines 802 is boxed and color-coded. Vision system software on the computer system identifies each laser line of vertical lines 802 and its precise point of intersection with edge 708 of ply 710. For example, portion 804 of laser line 702 intersects edge 708 at intersection point 805. As another example, laser line 806 intersects edge 708 at intersection point 808. Straight line 810 is then regressively fitted to these break or intersection points. Next, straight line 812 perpendicular to this regressive line, straight line 810, is extended until it intersects centerpoint 801 of boundary projection line 706, and length 814 of straight line 812 is then calculated. This process may be performed at several points along the regressive line, straight line 810. When the process is performed at several points along straight line 810, the boundary error, or the value representative of a distance between edge 708 and boundary projection line 706, may be defined as an average of these extension lengths. For example, the value representative of the distance between edge 708 and boundary projection line 706 may be an average of length 814 of straight line 812 and length 816 of straight line 818. In some illustrative examples, the value representative of the distance between edge 708 and boundary projection line 706 may be an average of lengths for each laser line of plurality of laser lines 704.

Figure 9:
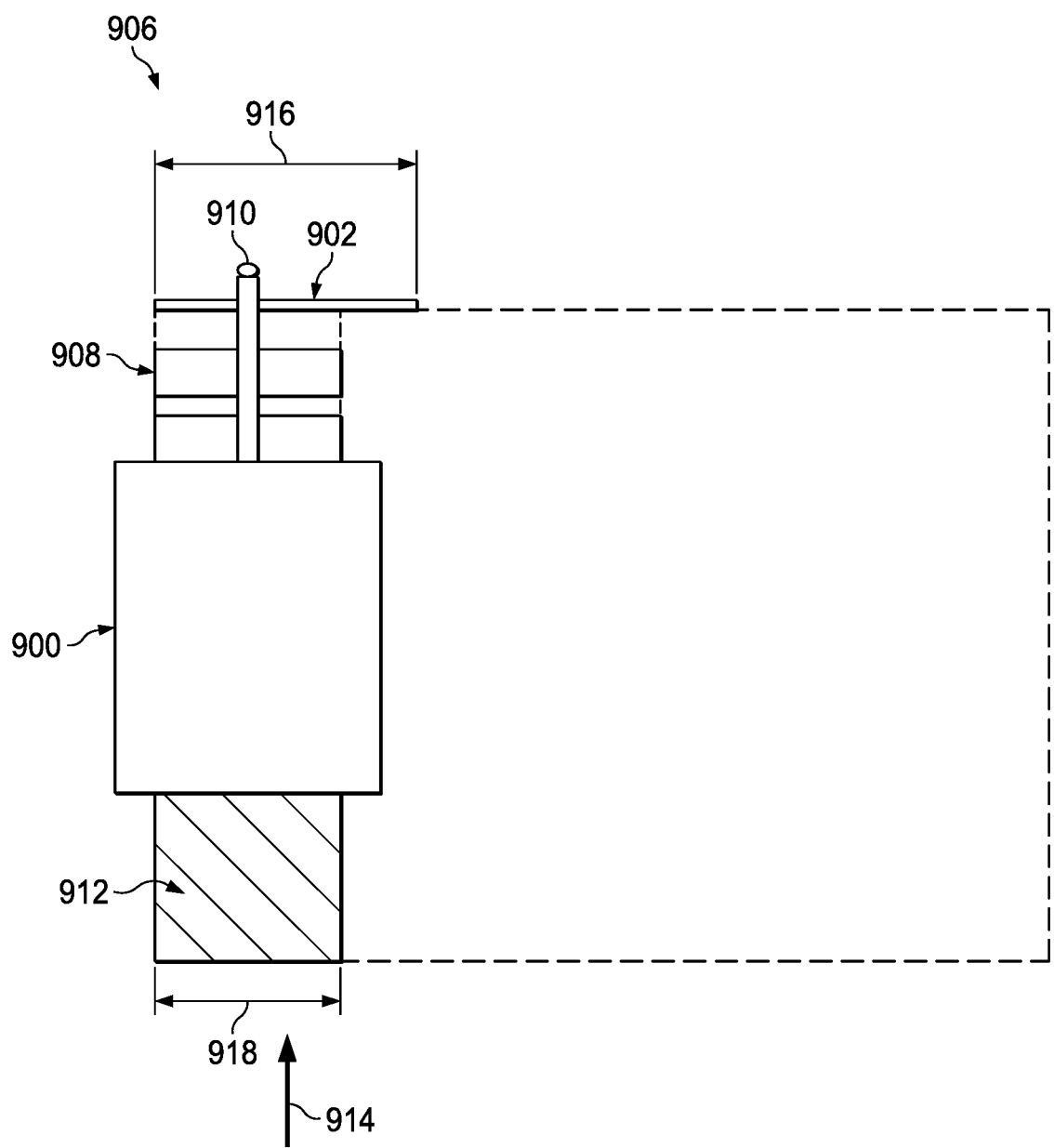
FIG. 9 is an illustration of an automated material placement head with a laser inspection system laying a course in accordance with an illustrative embodiment.

Turning now to FIG. 9, an illustration of an automated material placement head with a laser inspection system laying a course is depicted in accordance with an illustrative embodiment. Automated material placement head 900 is a simplified illustration of automated material placement head 110 of FIG. 1. Boundary projection line 902 is a physical implementation of boundary projection line 118 of FIG. 1.

In view 906, laser inspection system 908 and movable target 910 are connected to automated material placement head 900. As depicted, automated material placement head 900 is laying course 912 of composite material. To lay course 912 of composite material, automated material placement head 900 moves in direction 914.

Laser inspection system 908 is configured to project a laser beam into a laser line parallel to motion of automated material placement head 900 in laying the composite material. The laser line is parallel to direction 914. For clarity in description, direction 914 may be described as a longitudinal direction. This longitudinal direction is relative to the length of course 912. Thus, laser inspection system 908 is configured to project the laser beam into the laser line parallel to the longitudinal direction relative to the length of course 912 of the composite material.

As depicted, movable target 910 has passed boundary projection line 902. Boundary projection line 902 is used to determine if an edge of course 912 is within a tolerance of a desirable location for course 912.

Movable target 910 may be used to trigger a function of at least one of movable target 910, boundary projection line 902, or laser inspection system 908. For example, after movable target 910 crosses boundary projection line 902, boundary projection line 902 may cease to be projected. In some illustrative examples, when boundary projection line 902 ceases to be projected, another boundary projection line of number of boundary projection lines 146 of FIG. 1 may be projected. In another example, after movable target 910 crosses boundary projection line 902, laser inspection system 908 may be triggered to take a set of images. In another illustrative example, after movable target 910 crosses boundary projection line 902, movable target 910 may be rotated such that movable target 910 does not cross boundary projection line 902 when automated material placement head 900 moves to lay down a second course.

As depicted, length 916 of boundary projection line 902 is greater than width 918 of course 912. Boundary projection line 902 may be a representation of an edge of course 912 and a second course to be laid down.

Figure 10:
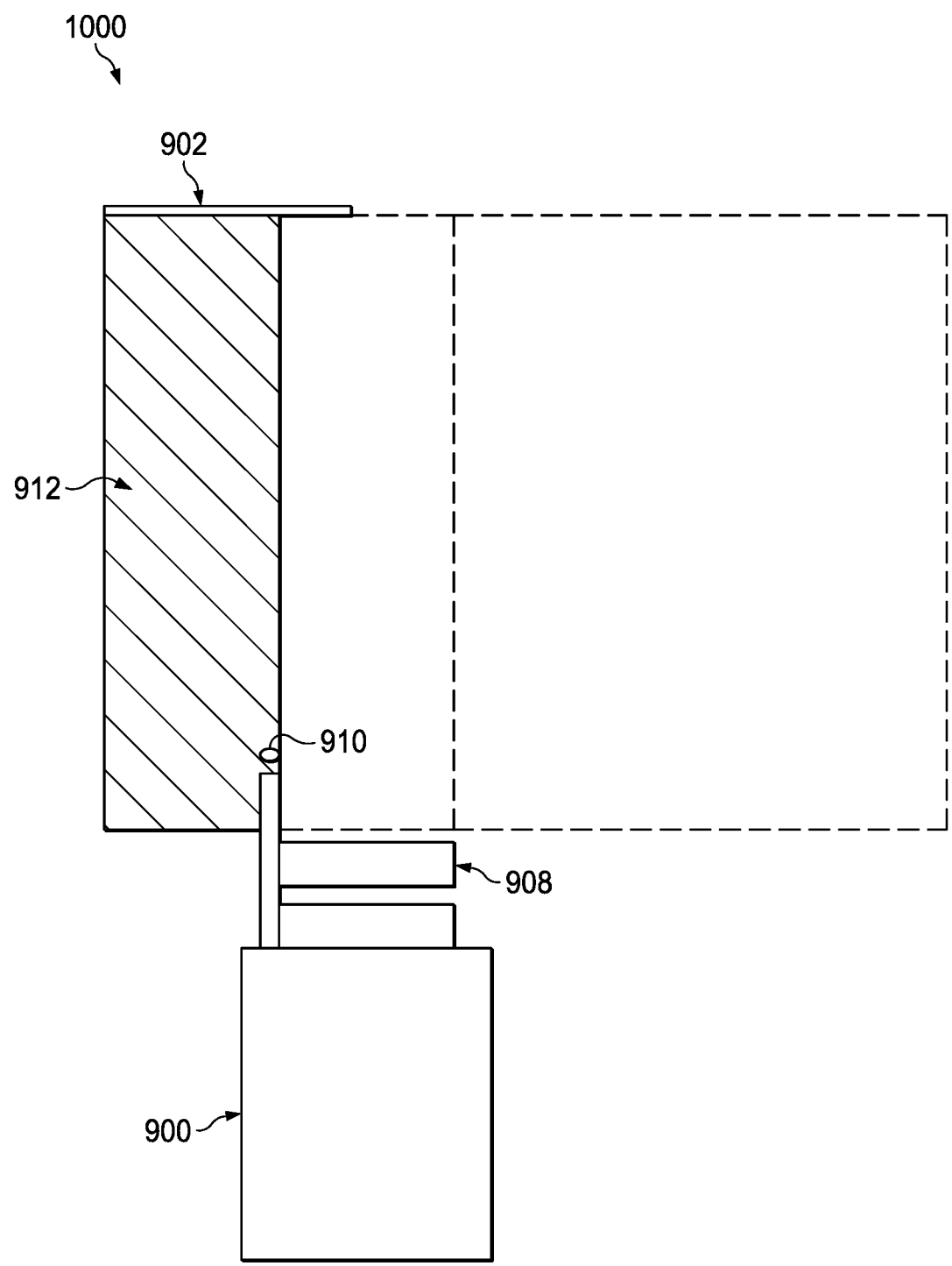
FIG. 10 is an illustration of an automated material placement head with a laser inspection system laying a second course in accordance with an illustrative embodiment.

Turning now to FIG. 10, an illustration of an automated material placement head with a laser inspection system laying a second course is depicted in accordance with an illustrative embodiment. View 1000 is a view of automated material placement head 900 of FIG. 9 after laying course 912. Automated material placement head 900 has been moved to lay down a second course of composite material. Boundary projection line 902 is still projected.

Figure 11:
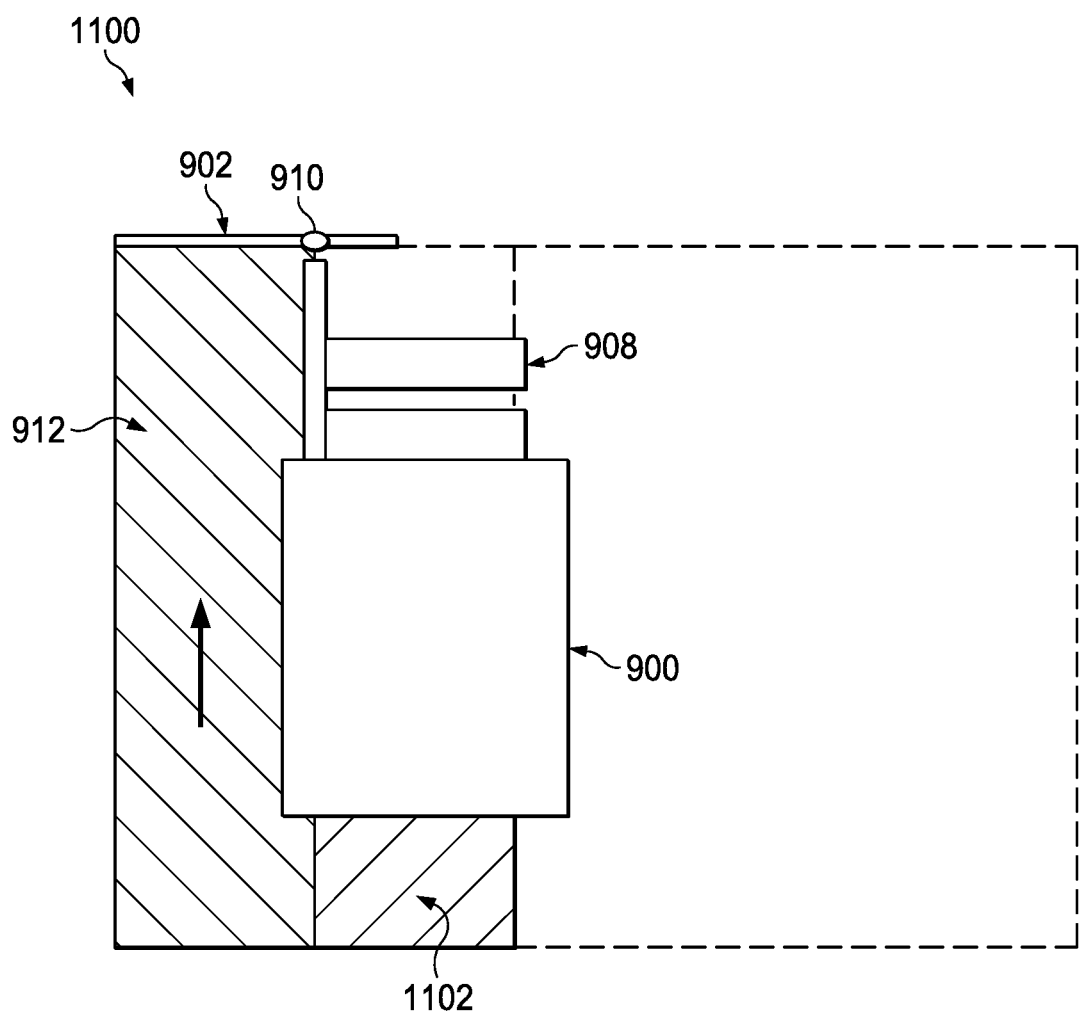
FIG. 11 is an illustration of an automated material placement head with a laser inspection system laying a second course in accordance with an illustrative embodiment.

Turning now to FIG. 11, an illustration of an automated material placement head with a laser inspection system laying a second course is depicted in accordance with an illustrative embodiment. In view 1100, second course 1102 of is being laid down by automated material placement head 900. In view 1100, movable target 910 has crossed boundary projection line 902 a second time. Boundary projection line 902 is used to determine if an edge of second course 1102 is within a tolerance of a desirable location for second course 1102.

Boundary projection line 902 does not extend past second course 1102. Thus, boundary projection line 902 cannot be used to verify an edge of a course other than course 912 or second course 1102. A second boundary projection line must be projected to measure an edge of a future course.

After view 1100, boundary projection line 902 is no longer projected. After view 1100, a second boundary projection line is projected. Ceasing to project boundary projection line 902 and beginning to project a second boundary projection line may be triggered by any desirable action. In one illustrative example, a location of movable target 910 may be the trigger. As another illustrative example, a portion of the commands for automated material placement head 900 may be the trigger. For example, a controller that sends instructions to automated material placement head 900 may also send commands to a laser projector, such as laser projector 114 of FIG. 1. In yet another example, an operator may trigger projecting a second boundary projection line. Any other desirable type of trigger may be used to cease projecting boundary projection line 902 and begin projecting a second boundary projection line.

The different components shown in FIGS. 2-11 may be combined with components in FIG. 1, used with components in FIG. 1, or a combination of the two. Additionally, some of the components in FIGS. 2-11 may be illustrative examples of how components shown in block form in FIG. 1 may be implemented as physical structures.

Figure 12:
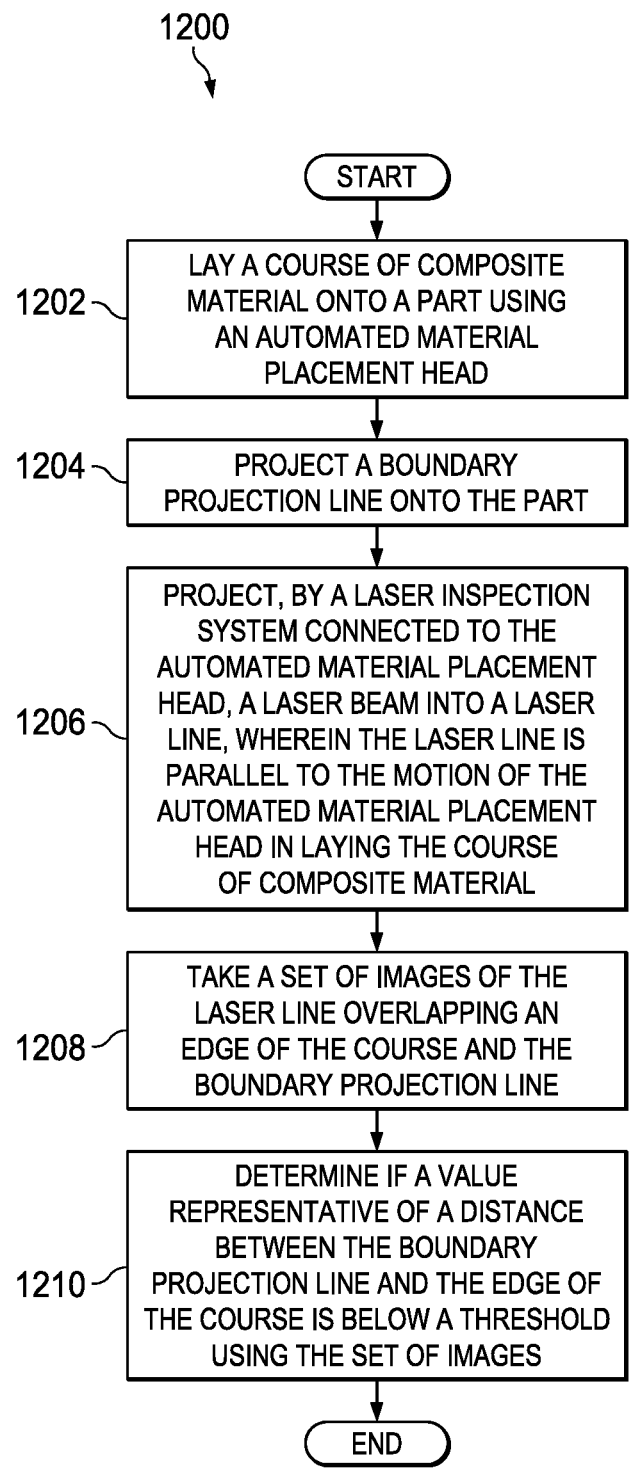
FIG. 12 is an illustration of a flowchart of a method for measuring a boundary of a course in a ply in accordance with an illustrative embodiment.

Turning now to FIG. 12, an illustration of a flowchart of a method for measuring a boundary of a course in a ply is depicted in accordance with an illustrative embodiment. Process 1200 may be used to lay down and inspect course 120 of FIG. 1. Process 1200 may use system 112 including automated material placement head 110 and laser inspection system 116 of FIG. 1. Process 1200 may take place in manufacturing environment 200 of FIG. 2. Process 1200 may be performed on at least one of course 308 of FIG. 2, course 408 of FIG. 4, course 508 of FIG. 5, or second course 609 of FIG. 6. Process 1200 may create and analyze image 700 of FIG. 7. Process 1200 may be implemented by automated material placement head 900 and laser inspection system 908 of FIGS. 9-11.

Process 1200 lays a course of composite material onto a part using an automated material placement head (operation 1202). Process 1200 projects a boundary projection line onto the part (operation 1204). In some illustrative examples, the boundary projection line is representative of a desired location of at least a portion of an edge of at least one course of the composite material of the part. In some illustrative examples, the boundary projection line is shorter than a width of the course. In other illustrative examples, the boundary projection line is longer than a width of the course and shorter than a width of a ply including the course.

Process 1200 projects, by a laser inspection system connected to the automated material placement head, a laser beam into a line, wherein the laser line is parallel to the motion of the automated material placement head in laying the course of composite material (operation 1206). Process 1200 takes a set of images of the laser line overlapping an edge of the course and the boundary projection line (operation 1208). In some illustrative examples, taking the set of images occurs prior to laying down a next course of composite material. In some illustrative examples, taking the set of images occurs in an inspection step in which all courses in a ply are inspected, including the course.

Process 1200 determines if a value representative of a distance between the boundary projection line and the edge of the course is below a threshold using the set of images (operation 1210). Afterwards the process terminates.

By determining if the value representative of the distance is below the threshold, it may be determined if the edge of the course is within a tolerance of the desired location. If the value is below a negative threshold, the value is considered unacceptable. If the value is a positive value and below a positive threshold, the value is considered acceptable.

If the value is a negative value and below a positive threshold, the positive threshold may be part of a tolerance band. In some illustrative examples, when the value is a negative value and is compared to a positive threshold, the value is also compared to a negative threshold of the tolerance band.

Figure 13:
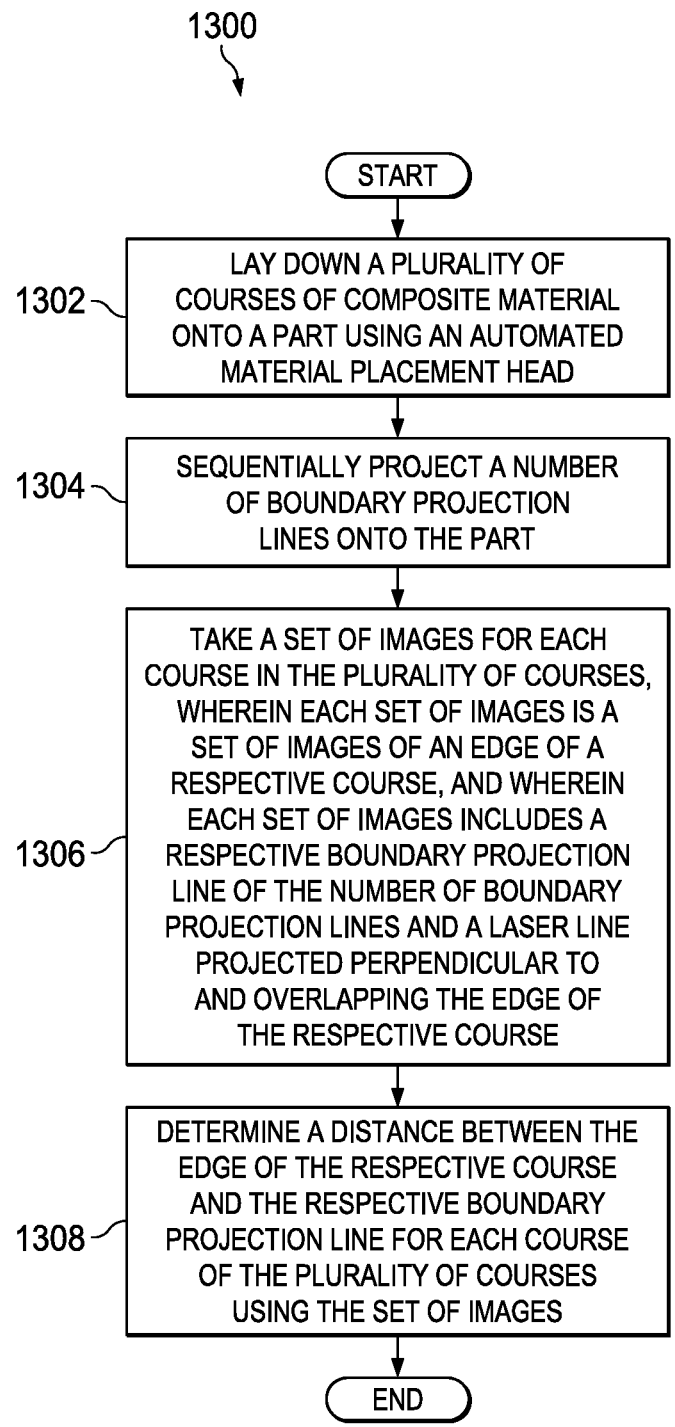
FIG. 13 is an illustration of a flowchart of a method for measuring a ply boundary in accordance with an illustrative embodiment.

Turning now to FIG. 13, an illustration of a flowchart of a method for measuring a ply boundary is depicted in accordance with an illustrative embodiment. Process 1300 may be used to lay down and inspect course 120 of FIG. 1. Process 1300 may use system 112 including automated material placement head 110 and laser inspection system 116 of FIG. 1. Process 1300 may take place in manufacturing environment 200 of FIG. 2. Process 1300 may be performed on at least one of course 308 of FIG. 2, course 408 of FIG. 4, course 508 of FIG. 5, or second course 609 of FIG. 6. Process 1300 may create and analyze image 700 of FIG. 7. Process 1300 may be implemented by automated material placement head 900 and laser inspection system 908 of FIGS. 9-11.

Process 1300 lays down a plurality of courses of composite material onto a part using an automated material placement head (operation 1302). Process 1300 sequentially projects a number of boundary projection lines onto the part (operation 1304). Process 1300 takes a set of images for each course in the plurality of courses, wherein each set of images is a set of images of an edge of a respective course, and wherein each set of images includes a respective boundary projection line of the number of boundary projection lines and a laser line projected perpendicular to and overlapping the edge of the respective course (operation 1306).

In some illustrative examples, operations of process 1300 may be performed concurrently. In some illustrative examples, each set of images is taken after laying down a respective course and prior to laying down a next course. In these illustrative examples, process 1300 may project a respective boundary projection line as the respective course is laid down.

In other illustrative examples, each of the sets of images is taken after all of the plurality of courses have been laid down. In these illustrative examples, process 1300 sequentially projects the number of boundary projection lines onto the part while taking the set of images for each course in the plurality of courses.

Process 1300 determines a value representative of a distance between the edge of the respective course and the respective boundary projection line for each course of the plurality of courses using the set of images (operation 1308). Afterwards the process terminates. In some illustrative examples, each boundary projection line of the number of boundary projection lines is representative of a desired location of at least a portion of an edge of a single course of composite material, and wherein each boundary projection line is shorter than an edge of a ply including the plurality of courses.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, process 1200 further comprises laying down a second course of composite material onto the part using the automated material placement head, wherein taking the set of images occurs after laying down the second course. In some illustrative examples, process 1200 further comprises ceasing to project the boundary projection line after taking the set of images, projecting a second boundary projection line onto the part, and taking a second set of images of the laser line overlapping an edge of a second course and the second boundary projection line.

Figure 14:
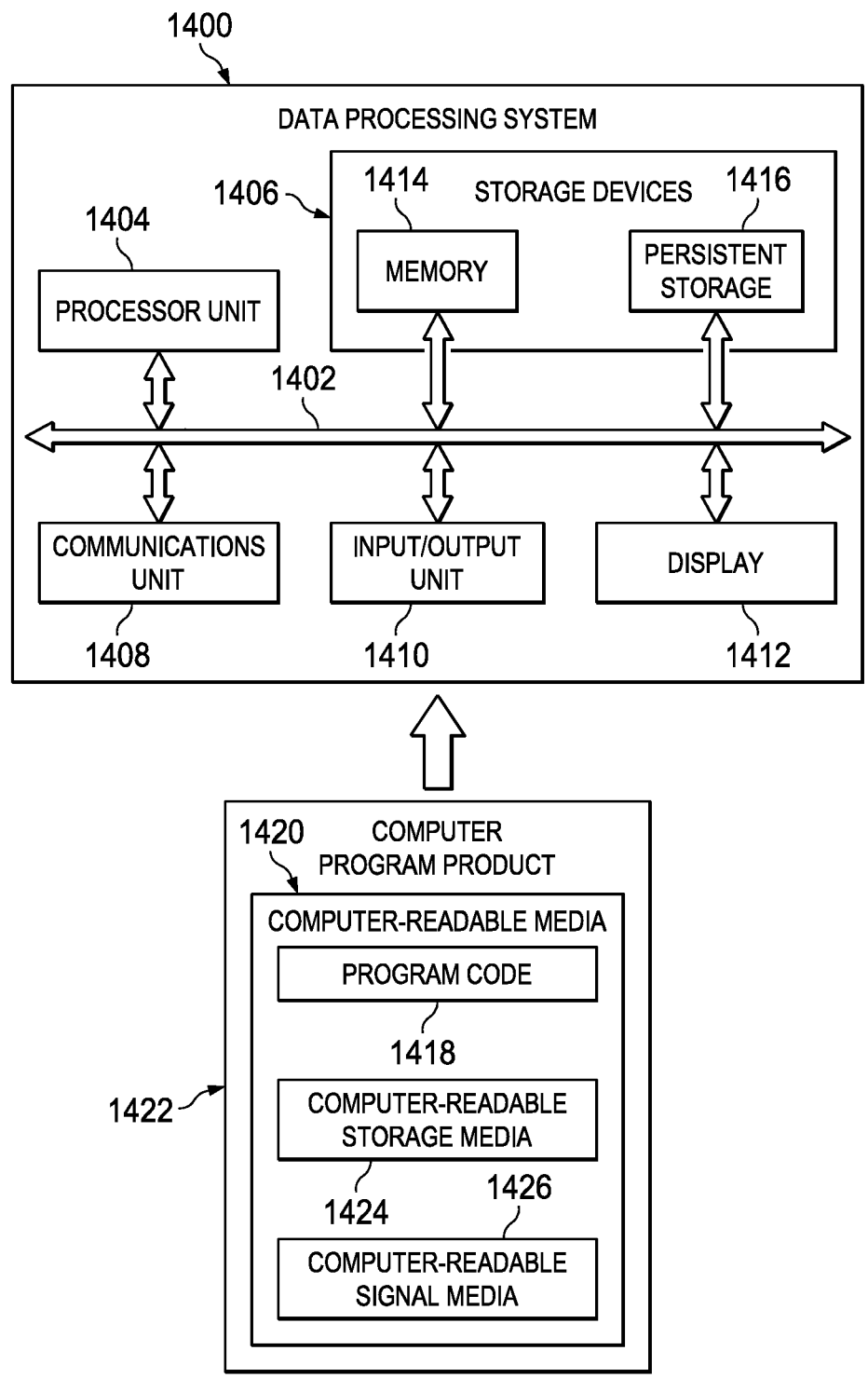
FIG. 14 is an illustration of a data processing system in the form of a block diagram in accordance with an illustrative embodiment.

Turning now to FIG. 14, an illustration of a data processing system in the form of a block diagram is depicted in accordance with an illustrative embodiment. Data processing system 1400 may be used to implement computer system 158 of FIG. 1. As depicted, data processing system 1400 includes communications framework 1402, which provides communications between processor unit 1404, storage devices 1406, communications unit 1408, input/output unit 1410, and display 1412. In some cases, communications framework 1402 may be implemented as a bus system.

Processor unit 1404 is configured to execute instructions for software to perform a number of operations. Processor unit 1404 may comprise a number of processors, a multi-processor core, and/or some other suitable type of processor, depending on the implementation. In some cases, processor unit 1404 may take the form of a hardware unit, such as a circuit system, an application specific integrated circuit (ASIC), a programmable logic device, or some other suitable type of hardware unit.

Instructions for the operating system, applications, and/or programs run by processor unit 1404 may be located in storage devices 1406. Storage devices 1406 may be in communication with processor unit 1404 through communications framework 1402. As used herein, a storage device, also referred to as a computer-readable storage device, is any piece of hardware capable of storing information on a temporary and/or permanent basis. This information may include, but is not limited to, data, a program code, and/or other types of information.

Memory 1414 and persistent storage 1416 are examples of storage devices 1406. Memory 1414 may take the form of, for example, a random access memory or some type of volatile or non-volatile storage device. Persistent storage 1416 may comprise any number of components or devices. For example, persistent storage 1416 may comprise a hard drive, a flash memory drive, a rewritable optical disk, a rewritable magnetic tape, or some combination of the above. The media used by persistent storage 1416 may or may not be removable.

Communications unit 1408 allows data processing system 1400 to communicate with other data processing systems and/or devices. Communications unit 1408 may provide communications using physical and/or wireless communications links.

Input/output unit 1410 allows input to be received from, and output to be sent to other devices connected to data processing system 1400. For example, input/output unit 1410 may allow user input to be received through a keyboard, a mouse, and/or some other type of input device. As another example, input/output unit 1410 may allow output to be sent to a printer connected to data processing system 1400.

Display 1412 is configured to display information to a user. Display 1412 may comprise, for example, without limitation, a monitor, a touch screen, a laser display, a holographic display, a virtual display device, and/or some other type of display device.

In this illustrative example, the processes of the different illustrative embodiments may be performed by processor unit 1404 using computer-implemented instructions. These instructions may be referred to as a program code, a computer-usable program code, or a computer-readable program code, and may be read and executed by one or more processors in processor unit 1404.

In these examples, program code 1418 is located in a functional form on computer-readable media 1420, which is selectively removable, and may be loaded onto or transferred to data processing system 1400 for execution by processor unit 1404. Program code 1418 and computer-readable media 1420 together form computer program product 1422. In this illustrative example, computer-readable media 1420 may be computer-readable storage media 1424 or computer-readable signal media 1426.

Computer-readable storage media 1424 is a physical or tangible storage device used to store program code 1418, rather than a medium that propagates or transmits program code 1418. Computer-readable storage media 1424 may be, for example, without limitation, an optical or magnetic disk, or a persistent storage device that is connected to data processing system 1400.

Alternatively, program code 1418 may be transferred to data processing system 1400 using computer-readable signal media 1426. Computer-readable signal media 1426 may be, for example, a propagated data signal containing program code 1418. This data signal may be an electromagnetic signal, an optical signal, and/or some other type of signal that can be transmitted over physical and/or wireless communications links.

The illustration of data processing system 1400 in FIG. 14 is not meant to provide architectural limitations to the manner in which the illustrative embodiments may be implemented. The different illustrative embodiments may be implemented in a data processing system that includes components, in addition to or in place of those illustrated, for data processing system 1400. Further, components shown in FIG. 14 may be varied from the illustrative examples shown.

The illustrative examples provide a method and an apparatus for performing ply boundary measurements. In some illustrative examples, the method is an in-process, vision-based method of performing ply boundary measurements on composite plies laid by the automated fiber and tape placement processes. By being in-process, the method is performed during composite material placement instead of during a separate inspection step. In other illustrative examples, the ply boundary measurements may be performed during a separate inspection step.

When the method is in-process, the equipment is mounted on the head of the placement machine, and a measurement is taken at the completion of each course laid, just after tows are cut. This measurement is the distance from the edge of the cut tows to a laser-projected boundary projection line.

The illustrative examples use an in-process automated shift of the projected boundary projection line to a shorter line more easily detected with vision-based technology than conventional boundary projection lines. The shorter boundary projection line enables ply boundary measurement by an in-process vision-based inspection system. The in-process vision-based inspection system may include a laser line projector.

In conventional vision systems, the laser lines would be projected perpendicular to the movement of the placement head. In the illustrative examples, the laser lines are projected parallel to the movement of the placement head.

In order to display the programmed boundary projection line, the laser projector first orients itself to the part by locating all of a set of designated targets. In manufacturing practice, this orientation is performed after the production mandrel or tool is clocked into position in the placement machine. Prior to beginning material placement, the laser projector performs a full self-alignment to a series of targets that are located both on the tool and on the placement machine.

The laser lines cross both the boundary projection line and the actual ply edge. In some illustrative examples, the laser lines are a red detection laser beam that crosses both the boundary projection line and the actual ply edge. The laser lines establish the points of intersection and provide the basis for determining any variation of the ply boundary from nominal. Although the illustrations depict the boundary projection line as a stationary line, the line is actually a moving or "flying" dot of light controlled by the laser projection system. A line would be captured by a slow shutter speed camera, while a blurred or flying dot would be captured by a faster shutter speed of a vision system camera.

In conventional processes, depending on the timing of the image capture and the position of the dot, the detection laser may be intersecting the dimmest portion of the boundary projection line. In the illustrative examples, in order to allow a measurable intersection point, the boundary projection line was shortened to a segment length with sufficient brightness.

For a composite structure that is fabricated by automated material placement, all the boundary projection lines for the plies are taken from the nominal ply dimension values in the model-based design (MBD) and are programmed for the laser projector as a package for that structure. For conventional inspections, each individual ply has a boundary projection line that is one "layer" of that package. In conventional inspections, as each ply is completed and the boundary is ready for inspection, the appropriate boundary projection line is called up by identifying the part number and layer.

To make the ply boundary suitable for inspection by a vision system as a part of an existing in-process inspection procedure, new layers are programmed and added to the boundary projection line package. Each new layer is a short linear segment that has any desirable length such that an end-of-ply boundary measurement is obtained for each course in the ply. Further, the desirable length is selected such that the laser line is of sufficient brightness to allow imaging and detection of the intersection with the red vision system laser, and its proximity to the actual ply edge. In some examples, each new layer is slightly longer than the width of the material course being laid down. In addition, the exposure time of the vision system camera can be lowered to a value that is typically used for in-process inspection on a moving placement head.

The general configuration of the placement machine head is illustrated in FIG. 2 and FIGS. 9-11. The laser inspection system is located above and slightly behind the compaction roller. This position of the laser inspection system allows the camera to image and inspect the material course for missing tows, tow gaps, tow overlaps, and foreign material without interfering with the process or creating a risk of collision with the surface.

A reflective laser target, when present, is mounted on an extension near the vision system. This laser target is also above the compaction roller, and can be above the camera or at one side, as long as the target passes through the boundary projection line ahead of other hardware.

The following description is one non-limiting illustrative example of how a laser target may trigger a laser projector during manufacturing. In this illustrative example, the laser projector may begin by projecting the boundary projection line for the entire ply. When the target is present and passes through the boundary projection line, the laser projector shifts to the next layer, which is the shortened line for the first course. As the machine cuts the tows and completes the course, the vision system makes the measurement. The deceleration of the head at the end of the course provides additional time for imaging and measurement.

As the placement head returns to the home position, allowing the reflective target to pass through the shortened boundary projection line which would cause a premature shift to the next layer, the shortened line for the next course. When the head approaches the end of the next course, passage of the target through the line would cause a shift to the layer of the following course before the boundary measurement could be made. To prevent this shift, the target extension is designed to either retract or rotate at least 90 degrees before the head returns home, to keep the target away from the laser line.

After completion of the first course, the target extension is positioned to the side of the vision system. This side positioning ensures that the target catches the shortened line of the previous course in order to shift to the next layer. The need for re-positioning could be mitigated by programming the length of each shortened line to be equal to the width of one and a half courses; however, depending on course width, the extra length could also reduce the brightness of the line and make detection more difficult.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system comprising:
a laser projector configured to project a boundary projection line onto a part;
an automated material placement head configured to lay down a course of composite material; and
a laser inspection system connected to the automated material placement head, wherein the laser inspection system is configured to project a laser beam into a laser line parallel to a motion of the automated material placement head in laying the composite material, wherein the laser inspection system comprises a filter, and wherein the filter is a same color as one of the boundary projection line projected by the laser projector or the laser beam projected by the laser inspection system.

2. The system of claim 1, wherein the laser inspection system further comprises a camera system configured to take a set of images of the laser line overlapping an edge of the course and the boundary projection line, and the system further comprising:
a computer system configured to determine a value representative of a distance between the edge of the course and the boundary projection line using the set of images.

3. The system of claim 1, wherein the laser projector and the laser inspection system create laser beams of different colors.

4. The system of claim 1, wherein the laser inspection system comprises at least one of a camera system, a filter, and a laser.

5. The system of claim 1, wherein the boundary projection line is representative of a desired location of at least a portion of an edge of at least one course of composite material of the part, including at least a portion of an edge of the course.

6. The system of claim 5, wherein a length of the boundary projection line is configured such that an image of the boundary projection line captured by a camera system of the laser inspection system is sufficiently bright to perform a measurement of a distance from the edge of the course to the boundary projection line.

7. The system of claim 1, further comprising:
a movable target connected to the automated material placement head, wherein the laser projector changes its projection based on a location of the movable target.

8. A method comprising:
laying a course of composite material onto a part using an automated material placement head;
projecting a boundary projection line onto the part;
projecting, by a laser inspection system connected to the automated material placement head, a laser beam into a laser line, wherein the laser line is parallel to a motion of the automated material placement head in laying the course of composite material;
taking a set of images of the laser line overlapping an edge of the course and the boundary projection line; and
determining if a value representative of a distance between the boundary projection line and the edge of the course is below a threshold using the set of images, wherein the boundary projection line is one of shorter than a width of the course or longer than the width of the course and shorter than a width of a ply including the course.

9. The method of claim 8, wherein taking the set of images occurs prior to laying down a next course of composite material.

10. The method of claim 8, wherein taking the set of images occurs in an inspection step in which all courses in a ply are inspected, including the course.

11. The method of claim 8, further comprising:
laying down a second course of composite material onto the part using the automated material placement head, wherein taking the set of images occurs after laying down the second course.

12. The method of claim 8, wherein the boundary projection line is representative of a desired location of at least a portion of the edge of the course of composite material.

13. The method of claim 12, further comprising:
ceasing to project the boundary projection line after taking the set of images;
projecting a second boundary projection line onto the part; and
taking a second set of images of the laser line overlapping an edge of a second course and the second boundary projection line.

14. A method comprising:
laying down a plurality of courses of composite material onto a part using an automated material placement head;
sequentially projecting a number of boundary projection lines onto the part;
taking a set of images for each course in the plurality of courses, wherein each set of images is a set of images of an edge of a respective course, and wherein each set of images includes a respective boundary projection line of the number of boundary projection lines and a laser line projected perpendicular to and overlapping the edge of the respective course; and
determining a value representative of a distance between the edge of the respective course and the respective boundary projection line for each course of the plurality of courses using the set of images, wherein each boundary projection line is shorter than an edge of a ply including the plurality of courses.

15. The method of claim 14, wherein each set of images is taken after laying down a respective course and prior to laying down a next course.

16. The method of claim 14, wherein each of the sets of images is taken after all of the plurality of courses have been laid down.

17. The method of claim 14, wherein each boundary projection line of the number of boundary projection lines is representative of a desired location of at least a portion of an edge of a single course of composite material.

18. The system of claim 1, wherein the laser projector is further configured to project the boundary projection line onto the part such that the boundary projection line is shorter than a width of the course.

19. The system of claim 1, wherein the laser projector is further configured to project the boundary projection line onto the part such that the boundary projection line is longer than a width of the course and shorter than a width of a ply including the course.

20. The method of claim 8, wherein taking a set of images further comprises generating the set of images using a filter, wherein the filter is a same color as one of the boundary projection line or the laser beam.

* * * * *